US007558859B2

(12) United States Patent
Kasiolas et al.

(10) Patent No.: US 7,558,859 B2
(45) Date of Patent: Jul. 7, 2009

(54) PEER-TO-PEER AUCTION BASED DATA DISTRIBUTION

(75) Inventors: Anastasios Kasiolas, San Mateo, CA (US); Ronald H. Jones, Jr., Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 11/252,002

(22) Filed: Oct. 17, 2005

(65) Prior Publication Data

US 2007/0088703 A1   Apr. 19, 2007

(51) Int. Cl.
G06F 15/173    (2006.01)
(52) U.S. Cl. ............................ 709/226; 358/1.16; 705/1; 705/7; 705/8; 705/26; 705/37; 707/200; 707/202; 718/104
(58) Field of Classification Search .................. 709/226
See application file for complete search history.

(56) References Cited

U.S. PATENT DOCUMENTS

| 5,394,324 | A | * | 2/1995 | Clearwater | 705/8 |
| 5,533,175 | A | * | 7/1996 | Lung et al. | 358/1.16 |
| 5,835,954 | A | * | 11/1998 | Duyanovich et al. | 711/162 |
| 6,230,200 | B1 | * | 5/2001 | Forecast et al. | 709/226 |
| 6,516,350 | B1 | * | 2/2003 | Lumelsky et al. | 709/226 |
| 6,587,865 | B1 | * | 7/2003 | Kimbrel et al. | 718/104 |
| 6,792,337 | B2 | * | 9/2004 | Blackett et al. | 700/295 |
| 7,409,360 | B1 | * | 8/2008 | Lark et al. | 705/26 |
| 2001/0039581 | A1 | * | 11/2001 | Deng et al. | 709/226 |
| 2003/0061062 | A1 | * | 3/2003 | Tucker | 705/1 |
| 2003/0236894 | A1 | * | 12/2003 | Herley | 709/229 |
| 2004/0010592 | A1 | * | 1/2004 | Carver et al. | 709/226 |
| 2004/0117224 | A1 | * | 6/2004 | Agarwal et al. | 705/7 |
| 2004/0243646 | A1 | * | 12/2004 | Teodosiu et al. | 707/200 |
| 2005/0021915 | A1 | * | 1/2005 | Lowe et al. | 711/154 |
| 2006/0122927 | A1 | * | 6/2006 | Huberman et al. | 705/37 |
| 2007/0005711 | A1 | * | 1/2007 | Hassounah et al. | 709/206 |
| 2007/0038751 | A1 | * | 2/2007 | Jorgensen | 709/226 |
| 2007/0106798 | A1 | * | 5/2007 | Masumitsu et al. | 709/226 |

(Continued)

OTHER PUBLICATIONS

Lai et al., "Tycoon: an Implementation of a Distributed, Market-based Resource Allocation System", Sep. 1, 2005, HP Labs Palo Alto.*

(Continued)

*Primary Examiner*—Firmin Backer
*Assistant Examiner*—Tobias J Casaw
(74) *Attorney, Agent, or Firm*—Vierra Magen Marcus & DeNiro LLP

(57) ABSTRACT

A peer-to-peer auction based strategy balances the storage of data in a data center. Each cluster of the data center has a cluster manager and associated data storage nodes on which data is stored. The data storage nodes can periodically announce their respective utilization levels to other data storage nodes. If the announcing nodes are over capacity, the other nodes in the cluster respond by checking their utilization level and placing a bid if they are able to accept new data. Data is then relocated to one or more selected bidding nodes. If data cannot be balanced at the data storage node level, the cluster manager can identify nodes in other clusters that are able to accept new data. Multiple auctions for the same or different categories of data can be conducted at the same time by the data storage nodes and/or cluster managers.

15 Claims, 13 Drawing Sheets

U.S. PATENT DOCUMENTS

2008/0126547 A1* 5/2008 Waldspurger ................ 709/226

OTHER PUBLICATIONS

Bertsekas et al.,"The Auction Algorithm for The Transportation Problem", Feb. 1989, Laboratory for Information and Decision Systems, M.I.T., Cambridge, MA.*

Takahashi et al., "Auction-based effective bandwidth allocation mechanism", Feb. 23-Mar. 1, 2003, Telecommunications, 2003. ICT 2003. 10th International Conference on, vol. 2, On pp. 1046-1050 vol. 2.*

Gagliano et al., "Auction allocation of computing resources", Jun. 1995, Communications of the ACM, vol. 38, Issue 6, pp. 88-102.*

"Design Patterns," Addison-Wesley Professional; 1st edition (Jan. 15, 1995), Gamma et al., ISBN 0201633612, pp. 315-323.

* cited by examiner

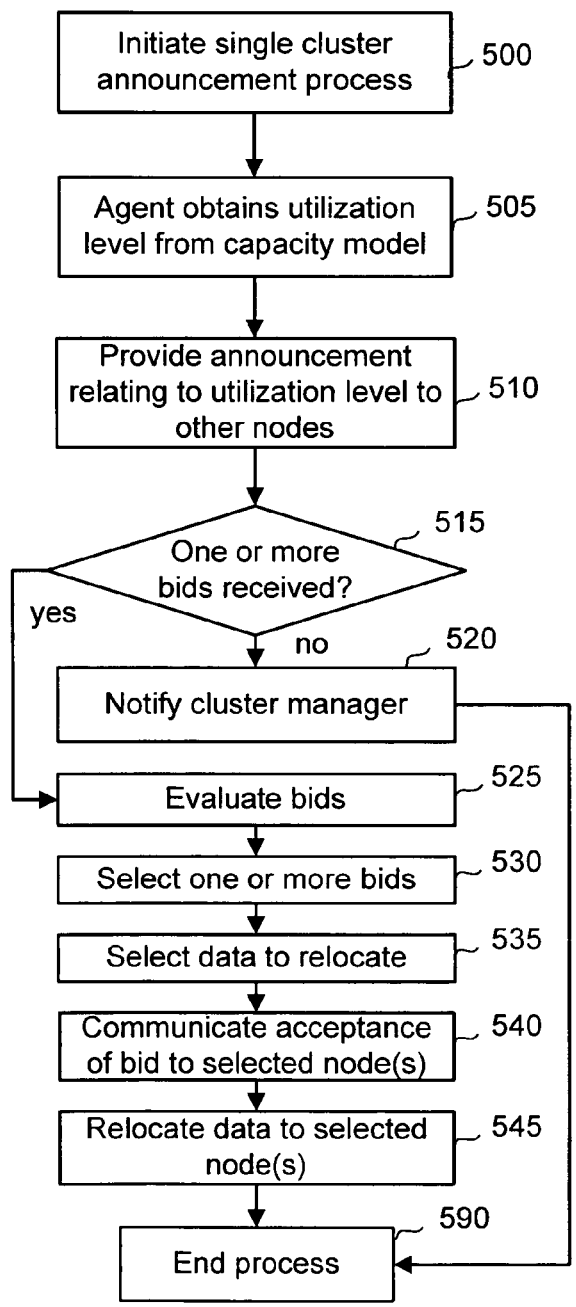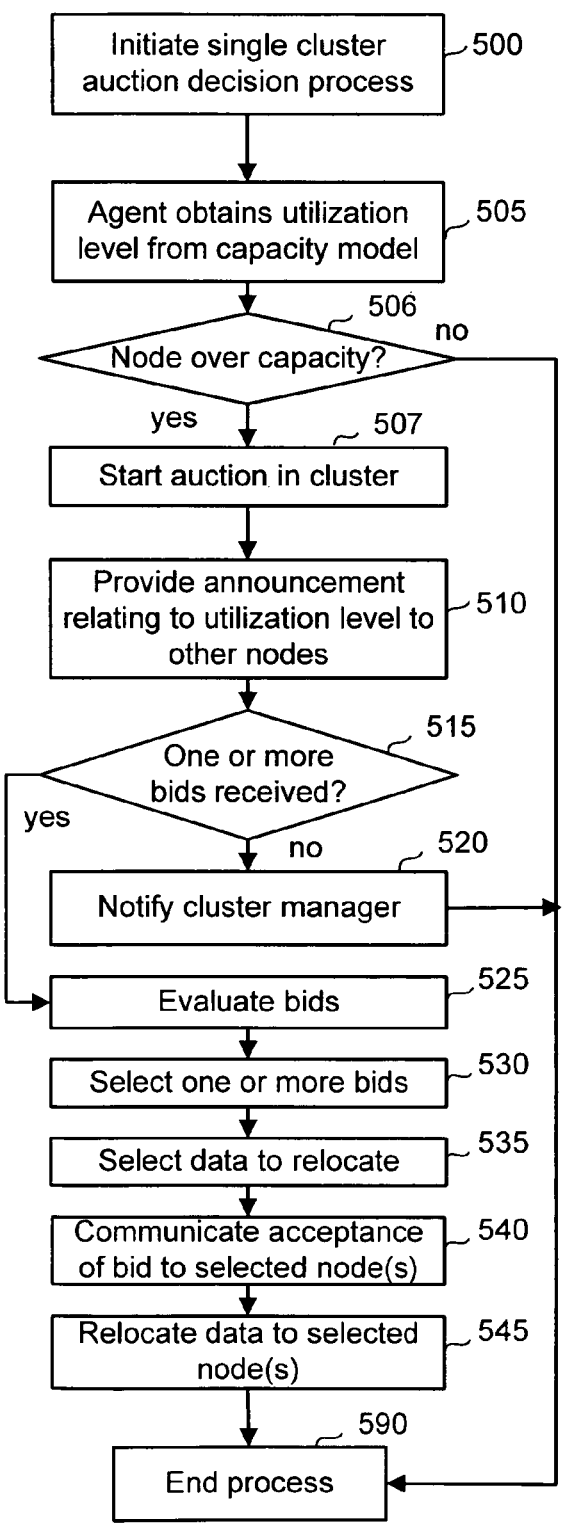

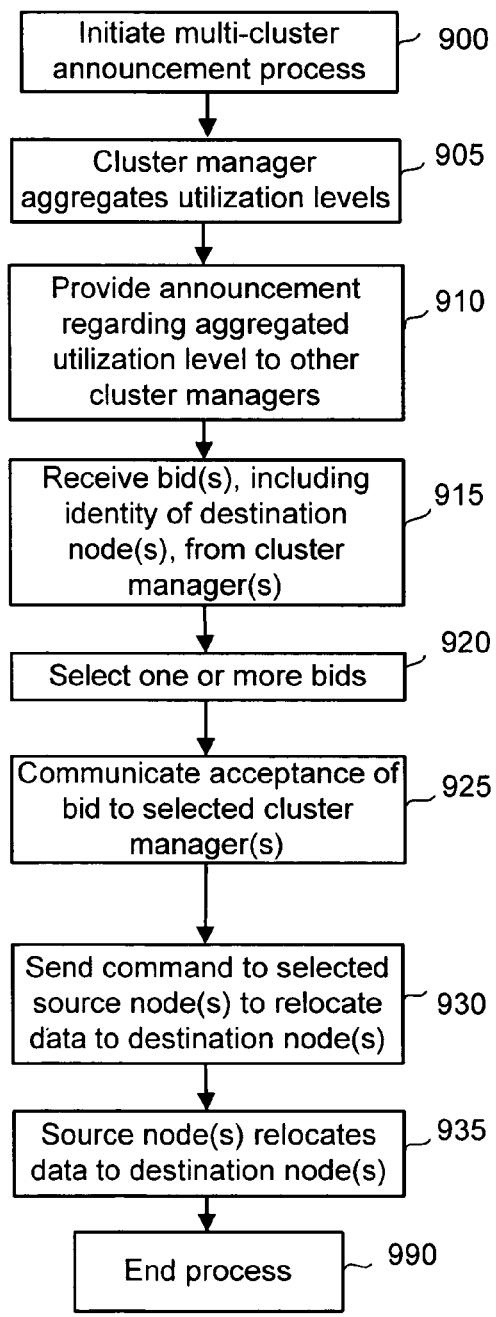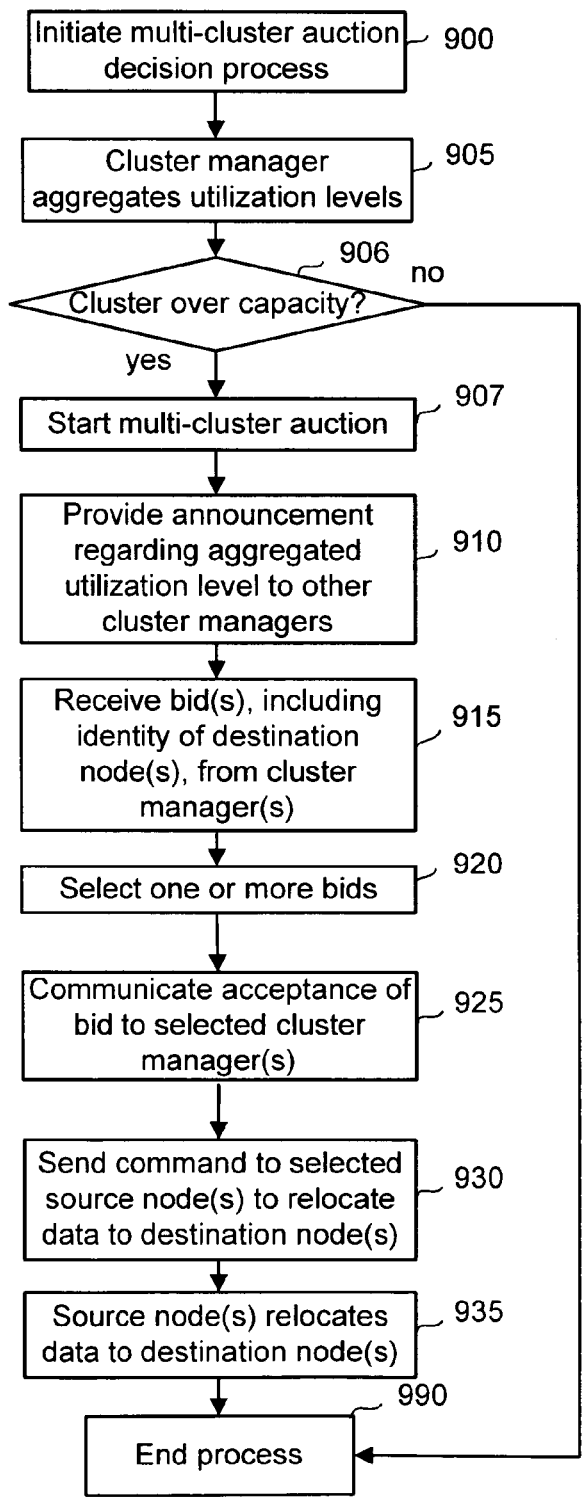

PEER-TO-PEER AUCTION BASED DATA DISTRIBUTION

BACKGROUND

Data centers include data storage nodes for storing data. For example, a data center for a web-based application such as email may employ a number of data storage nodes that are geographically distributed. Each location may include a number of storage servers for storing data relating to users' email accounts, such as the text of emails, preferences for displaying emails and so forth. In such large, geographically distributed data centers, or even at a single location, which can store very large amounts of data, there is an issue of optimal data placement. Typically, some information in the data center is accessed more often or has a different access pattern. Some parts of the distributed system are constantly under traffic or resource pressure while others are always underutilized. This creates an imbalance as far as the resource utilization of the data center is concerned.

Existing approaches to optimal data placement typically use ad hoc techniques that require intensive manual labor to distribute the data load across the nodes of the data center. These approaches lack automation, and require extensive manual analysis of data access patterns, traffic behavior, and the like. Furthermore, the resulting data balancing strategy is static. Once a balancing strategy has been agreed upon based on some manual investigation, the data in the system is manually rebalanced to relocate specific data from one node to another. This is expensive in terms of the man-hours that have to be spent in analyzing data points to come up with a recommendation. Moreover, operators are required to be closely involved in the relocation process. Human intervention is error prone and can fail in unexpected ways which are costly to repair. An additional drawback is that scalability is not provided as the data center grows. In fact, the cost of data relocation can increase exponentially as the size of the data center grows.

SUMMARY

The technology herein, roughly described, provides a peer-to-peer auction based strategy for balancing the storage of data in a data center.

In one approach, data is stored in different clusters of a data center, where each cluster has a cluster manager and a number of associated data storage nodes on which the data is stored. The data storage nodes within a cluster can periodically check their respective utilization levels, while also periodically announcing the utilization levels to each other within a configurable time period. Nodes in the cluster place bids to receive data if they are able to accept new data. Data is then relocated to one or more of the bidding nodes whose bids are accepted. If data cannot be balanced at the node level, the cluster manager can communicate with the other clusters to identify other clusters that can accept new data. Data can be relocated directly from one or more source nodes to one or more destination nodes of a cluster that bids to receive data, and whose bid is accepted. Furthermore, multiple auctions for different categories of data can be conducted at the same time by the data storage nodes and/or the cluster managers. The data load among the clusters, and nodes within a cluster, can thereby be balanced automatically on an ongoing basis, thereby reducing operation costs significantly.

In one specific approach, the data storage nodes periodically announce their utilization levels regardless of whether they are over capacity, under capacity or in an intermediate range. In another specific approach, the data storage nodes announce their utilization levels only when they are over capacity.

Furthermore, the relocation of the data can be controlled so that it trickles slowly from node to node to ensure that the system does not become unstable. An aging process can also be implemented to prevent the same data sets, such as data from the same user accounts, from being relocated too frequently.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 5a illustrates a flowchart showing a method by which a data storage node conducts an auction.

FIG. 5b illustrates a flowchart showing an alternative method by which a data storage node conducts an auction.

FIG. 9a illustrates a flowchart showing a method by which a cluster manager conducts a multi-cluster auction.

FIG. 9b illustrates a flowchart showing an alternative method by which a cluster manager conducts a multi-cluster auction.

DETAILED DESCRIPTION

An architecture for optimal placement of data amongst different data storage nodes in a data center is provided. In particular, a peer-to-peer auction based strategy is provided that is based on the assumption that, due to ever changing data needs, no true centralized optimal allocation might exist for more than an instant of time. In the auction, data storage nodes exchange bids on data based on their capacities. This allows the data to be self balanced on a data storage node level according to a capacity model. The architecture provides a scalable, automated, efficient, and reliable way to balance the data across a distributed data center based on a list of constraints that is configurable, thus obviating or minimizing the need for operator interaction. The constraints that are specified may be used to formulate a capacity model that is enforced across the data center. After a balancing operation is performed, the data should comply with the capacity model while minimizing the number of relocation operations across data storage nodes, thus minimizing cost.

Furthermore, the architecture can be fully automated, in which case no operators are needed to interact with the system to balance the data center. Moreover, the architecture can be based on services that are deployed in the data storage nodes, so that there is no need for a central coordinator, and the operation can be fully distributed and dynamic. The architecture can be hierarchical so it can scale to any number of data storage nodes as long as they are organized hierarchically. Manageability is provided by offering administrators full insight and control of the operation, and providing the ability to deploy in stages on parts of the data center. Reliability is provided since intermittent network outages or hardware failures that can prevent a data storage node from participating in one or more cycles of the rebalancing operation are prevented from affecting the rest of the data storage nodes. Furthermore, the architecture is highly resilient to individual data storage node failures and has self-healing capabilities. A configurable balancing strategy can be changed dynamically without hardware reconfiguration or new software deployment. Finally, the architecture is scalable because it can operate hierarchically by first attempting to balance the data within a set of neighboring data storage nodes that belong to the same cluster and, if this is not possible, operate on a higher hierarchical level by trying to balance data across different clusters of the data center. In this way, only the minimum set of data is moved across the clusters and/or data storage nodes. By minimizing data relocations, the costs involved are also minimized.

Figure 1:
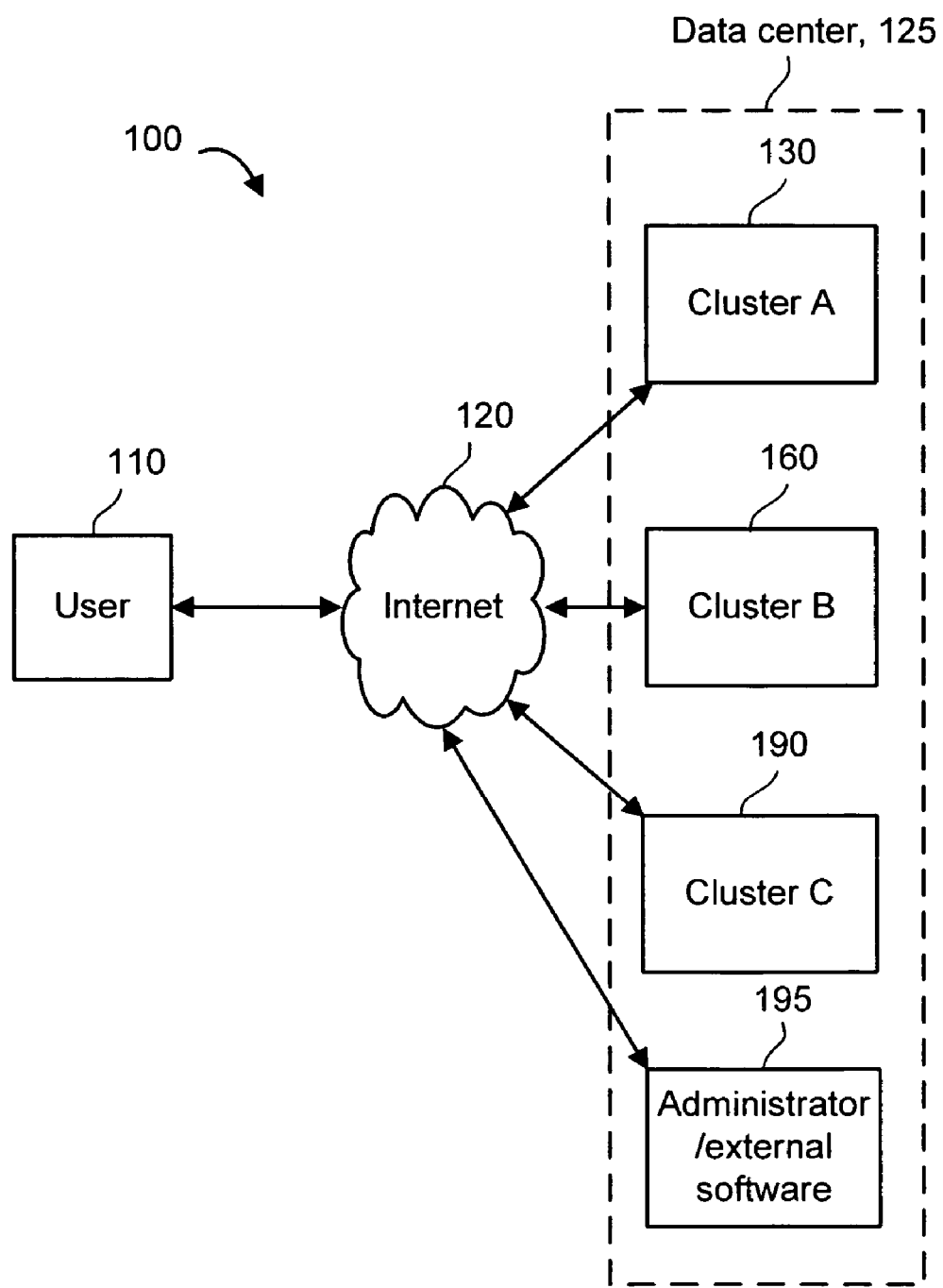
FIG. 1 illustrates a topology in which clusters of a data center store data for users.

FIG. 1 illustrates a topology in which clusters of a data center store data for users. The topology 100 includes an example user computer 110 which can communicate via a network cloud 120 with one or more clusters of a data center 125, such as clusters 130, 160 and 190, each of which includes one or more data storage nodes. For example, a data storage node may include a server or other host computer with disks for storing data. The network cloud 120 may represent the Internet or other wide area network, a local area network, or any other type of network. An administrator/external software function 195 may be used to provide commands to a cluster. The administrator/external software function 195, which can be within or outside of a cluster, may include a workstation with a user interface display that allows a human operator to manually provide commands to components in a cluster and view related information. External software, such as an external managing agent, can be used to automatically generate a request to relocate and balance data. In either case, interactive tools may be used to issue, monitor, manage, and extract information about the current state of relocation and balancing operations.

In one possible example, the user computer 110 runs a web browser application for accessing the Internet via an Internet Service Provider, not shown. The clusters 130, 160 and 190, may store data for enabling an application such as email. In one approach, each cluster represents a subnet of a domain, or other components which are in a building or otherwise geographically proximate to one another, while the data center 125 represents a group of geographically distant clusters. Typically, the user establishes an account and indicates various preferences regarding the display of the email, how email messages should be handled when received or sent, and so forth. The user may also enter commands for joining distribution lists, uploading digital photos or video to share with friends, and performing various other tasks which require data to be stored. The data of a given account is stored at one location or cluster of a data center so that it can be readily accessed and updated, e.g., when the user accesses the account such as by sending or receiving an email. In the example provided, the data center 125 is distributed in that the clusters 130, 160 and 190 can be geographically remote from one another. However, this is not required. By organizing the data center in clusters, the system can scale to larger numbers of clusters in a predictable way.

Figure 2:
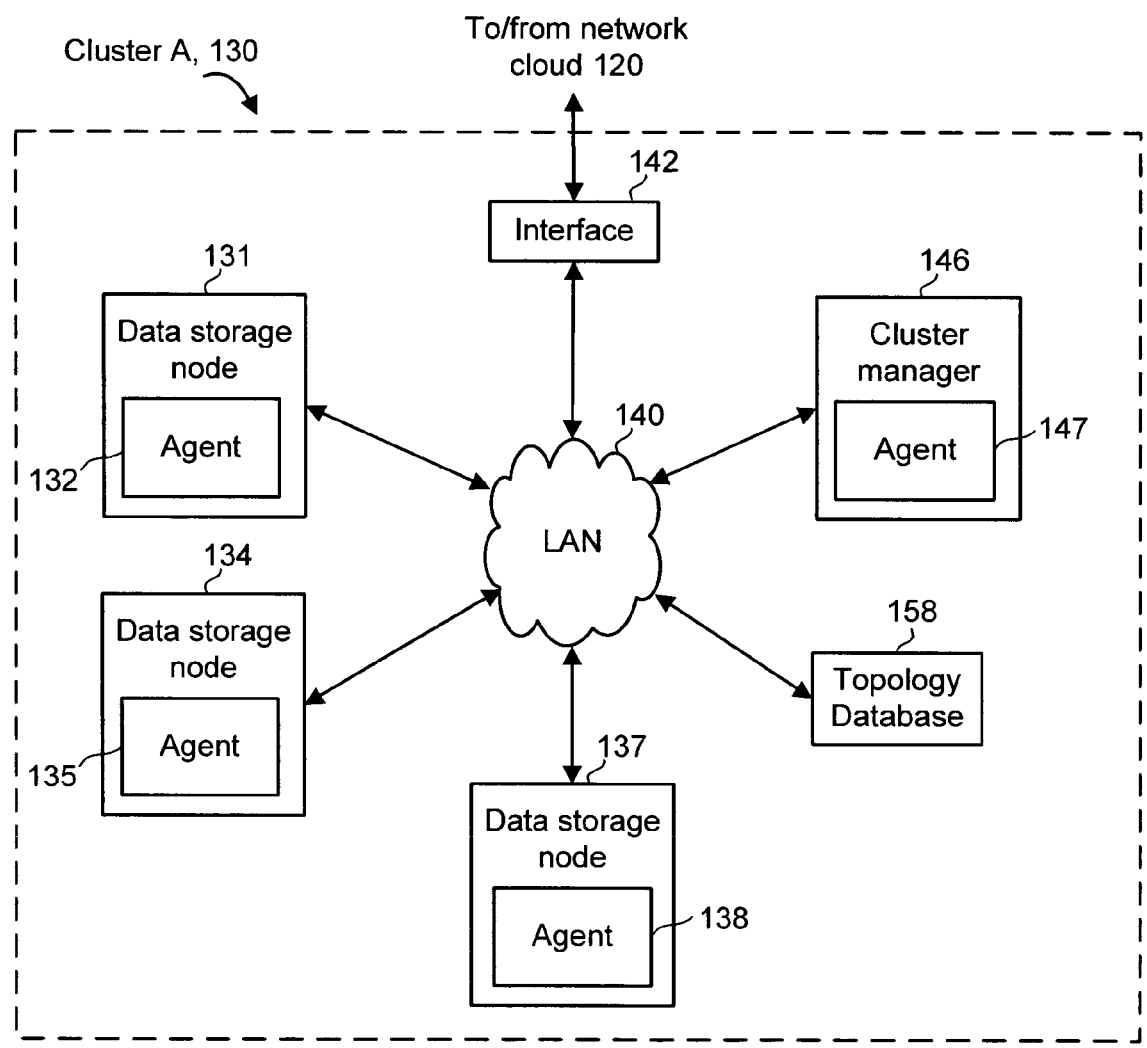
FIG. 2 illustrates a configuration of a cluster of a data center.

FIG. 2 illustrates a configuration of a cluster of a data center. The example cluster 130 includes a number of data storage nodes 131, 134 and 137, each of which includes agent software 132, 135 or 138, respectively, which enables data to be relocated via a peer-to-peer auction process to achieve data balancing within a cluster and/or across multiple clusters. The agents are lightweight software programs that run in the background to carry out balancing and relocation tasks. An agent can be implemented as a Windows service or a Unix daemon process, for instance. The multiple software agents that are deployed across a cluster and/or different clusters of a data center can be activated to facilitate simultaneous distributed balancing operations. Each software agent can access the topology database of any cluster to obtain network address information, and can connect to another agent of the same or a different cluster. Two agents can communicate with each other directly and exchange data in a peer-to-peer fashion.

A cluster manager 146 with an agent 147 may be used to initiate data balancing operations with other clusters. In a hierarchical approach, the data storage nodes 131, 134 and 137 first attempt to balance their respective data loads without input from the cluster manager 146. If this cannot be achieved, the cluster manager 146 communicates with the other clusters to exchange data. While a hierarchy with two levels is shown, the concept can be extended to any number of hierarchical levels. For example, an additional hierarchical level above the cluster manager level may include multiple clusters. For instance, with a data center having nine clusters, there may be three subsets of clusters, each with three clusters. Data balancing is first attempted at the lowest level, the single cluster level, then within a cluster subset, and finally across the entire data center. The data storage nodes and the cluster manager may further be responsive to commands provided by the administrator/external software function 195 (FIG. 1). Further information regarding an example computer configuration which can be used for the cluster manager 146 and the data storage nodes 131, 134 and 137, is provided in FIG. 11, discussed further below. It is also possible for the functionality of the cluster manager 146 to be provided on the same computer device as one of the data storage nodes 131, 134 or 137.

A topology database 158 may be used to store data identifying network addresses, such as IP addresses, of different data storage nodes and/or cluster managers in the different clusters. The network addresses may alternatively be stored in a configuration file or lookup table. Each data storage node and cluster manager may have its own external network address such as an IP address, or a local network address which is translated to an external network address using a network address translator. A network interface 142 provides communication between the cluster A (130) and the network cloud 120 generally to allow communication with other clusters, users and so forth. Optionally, each node and the cluster manager 146 have an associated external network interface. A network cloud 140 may represent a local area network (LAN), for instance, which enables the different components in the cluster 130 to communicate with one another. Furthermore, a firewall may be implemented using techniques known to those skilled in the art to prevent unauthorized access to the cluster 130 and to the data center generally. The use of packet filtering, application gateways, circuit-level gateways, and proxy servers, for instance, can be effective in providing a desired level of security.

Figure 3:
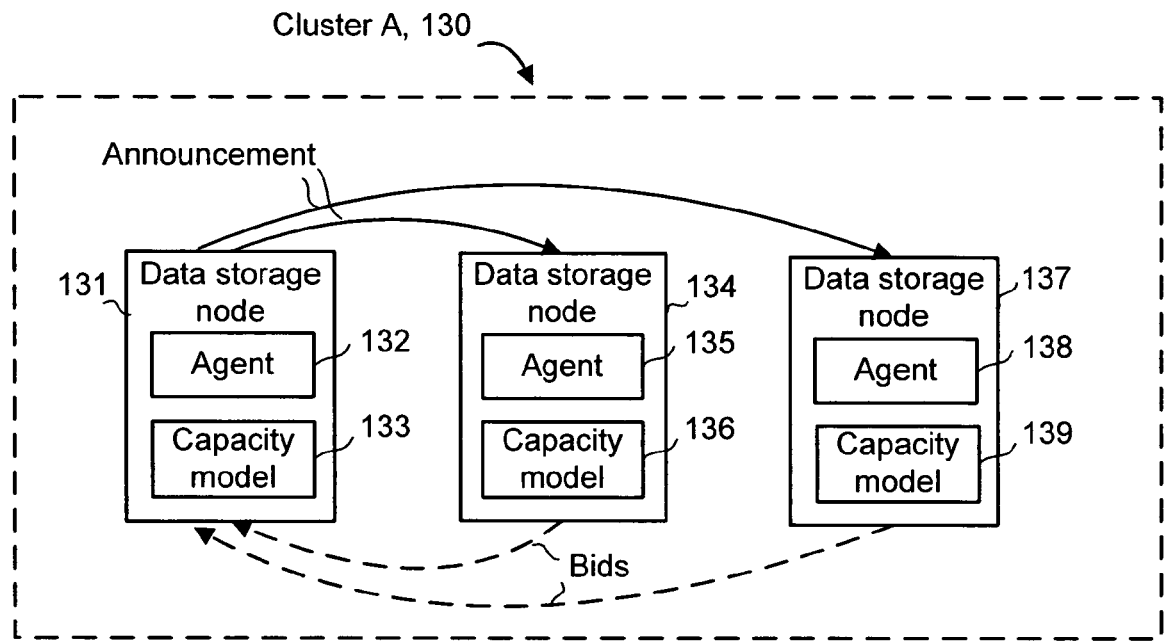
FIG. 3 illustrates an auction in a cluster of a data center.

FIG. 3 illustrates an auction in a cluster of a data center. Any of the data storage nodes 131, 134 and 137 can initiate an auction to exchange data with one or more other nodes. Moreover, multiple auctions of one or more nodes can take place at the same time. In one approach, the data storage nodes 131, 134 and 137 periodically access a respective capacity model 133, 136 or 139 to determine a utilization level which indicates, e.g., whether the data storage node is over capacity, under capacity, or within a balanced, intermediate range. The data storage node may be considered to be over capacity when the utilization level exceeds an upper threshold, for instance, and under capacity when the utilization level is below a lower threshold. The utilization level can represent an absolute amount of data stored at a node, or a relative amount of data over or below the capacity or similar target level, for instance, +10 MB or +10%, or −10 MB or −10%, or simply an indication that the node is over- or under-capacity, e.g., by setting a flag. The capacity model may use any type of measurable metric, e.g., based on a portion of the memory resources of a data storage node which are currently used, a number of data accounts which a data storage node is servicing by storing and accessing associated account data, a number of such accounts which represent high activity users, a traffic level which is processed, such as an average data rate in bytes/second, and/or a number or rate of read and write operations. The capacity models 133, 136 or 139 can be the same on all data storage nodes. Or, different capacity models may be used on the different data storage nodes.

Furthermore, the capacity model may provide different utilization levels, such as for different categories or buckets of user accounts which are serviced by the data storage node. For example, separate utilization levels can be provided for high, medium and low activity user accounts, which consume, respectively, a relatively high, medium, or low amount of processing and/or memory resources. In this case, it may be desired to balance the data on the different nodes in the cluster so that a given node is not burdened by a disproportionate number of high activity accounts. That is, the high activity accounts can be distributed relatively evenly among the different nodes, as can the medium and low activity accounts. Generally, any type of capacity model can be used to enable a data storage node to determine when it is over capacity with respect to one or more categories of data, and should therefore attempt to relocate data to another node, or when it is under capacity with respect to one or more categories of data, and therefore is available to receive relocated data from another node.

Various approaches can be used to determine when the data storage nodes should determine their respective utilization levels. In one approach, re-balancing occurs at regular intervals and on an ongoing basis, but not so frequently that it interferes unduly with the regular tasks of the data storage nodes in servicing user accounts. For example, the data storage nodes may maintain respective timers that determine when to check their utilization level and announce the level to the other data storage nodes. The timers may be synchronized by a central time server, for instance. The checking and announcing can be at regular or irregular intervals. In another possible approach, a token may be passed among the data storage nodes to indicate when to check and/or announce the utilization level. Further, the checking of the utilization level can occur at the same time or a different time than the announcing of the utilization level. It is also possible for the cluster manager, or for the administrator/external software function, to command each node to check its utilization level and/or to announce the level at appropriate times.

In one approach, the data storage node communicates its utilization level to the other data storage nodes in the cluster at regular intervals, even if the data storage node does not need to relocate data. Essentially, each of the nodes can periodically transmit their utilization levels in respective announcements regardless of whether they are over capacity, under capacity or in an intermediate range. That is, one or more utilization levels can be provided to the other data storage nodes without regard to a determination that the one or more utilization levels exceed a threshold. Moreover, these announcements can be asynchronous or synchronous among the different nodes. A node which needs to relocate data monitors the incoming announcements and can accept one or more of them as bids. This approach allows for loose coupling between the communication of an announcement by a particular node and the accepting of a bid by that node.

In another approach, the data storage node communicates its utilization level to the other data storage nodes only when it determines that it is over capacity, for instance, or satisfies some other criterion that indicates it should reduce the amount of data stored. Nodes which can receive data can then place a bid in response to a particular need indicated in an announcement. Approaches where the over capacity node initiates the auction are resilient because, even if an individual under capacity node fails to place a bid, the over capacity node can choose another bid from another node so that the balancing operation will succeed. An alternative approach is to have the under utilized nodes which can accept data initiate an auction. In this case, a data storage node which needs to relocate data can accept one or more offers to receive data. This approach should account for the fact that auctions may be initiated even when there are no over capacity nodes that need to relocate data.

In yet another possible approach, only the nodes that can receive data announce their utilization levels. The nodes that need to relocate data receive the announcements/bids and respond by accepting one or more of the announcements/bids. In yet another possible approach, only the nodes that can receive data, e.g., under capacity nodes, or that need to relocate data, e.g., over capacity nodes, announce their utilization levels, and nodes in an intermediate range do not participate.

For example, the agent 132 of the node 131 may announce the utilization level to nodes 134 and 137, as indicated by the solid arrows. For instance, the announcement can be broadcast or multicast using a publish-subscribe system to any process which has registered interest in receiving it. The agent 132 can publish its announcements to automatically notify the agents 135 and 138, which have registered as subscribers. The notification may use the Transmission Control Protocol (TCP) or the User Datagram Protocol (UDP), for instance. TCP enables two hosts to establish a connection and exchange streams of data, while providing reliable transport, flow control and congestion control. UDP, although not having reliability features built in, should be suitable for use within a controlled network environment. It also has the benefit of supporting multicasting which enables announcements to be monitored from any interested machine. Components wishing to receive announcements can listen asynchronously on a multicast UDP socket. In particular, the components can register to receive announcements by knowing the multicast IP address and port number. They then register interest by joining the multicast group and listening for messages. To unregister interest in announcements, a component can drop from the multicast group. In one possible specific implementation, sending an announcement involves connecting to the multicast IP address and port, constructing the announcement with a payload which is an XML fragment with the related information, and casting the fragment.

The announcement can provide information such as the identity of the announcing node and information for contacting it, such as a network address, as well as an amount and/or category of data which it is attempting to relocate. For instance, the announcement may indicate that the data storage node is attempting to relocate twenty accounts of high-activity users, or simply twenty accounts, without specifying a category. The data need not be expressed in terms of user accounts. For instance, the announcement may indicate a size of the data to be relocated, e.g., 25 MB, and any restrictions as to whether the data must be taken as a unit, or whether it can be divided. For data that can be divided, the announcement may indicate the data storage node is attempting to relocate five data units of 2 MB each, and three data units of 5 MB each, for instance. Any type of coding scheme can be used to convey information in the announcement regarding the type of data to be relocated, the amount, and any restrictions on which data must be kept together. Other requirements may be specified as well, such as a compression or coding scheme used by the data, how the data is to be maintained, e.g., whether one or more replica or mirror copies must be maintained, and so forth. Moreover, one or more announcements can be provided in parallel. For example, a data storage node may initiate a first auction to relocate data of a first category, e.g., high activity user accounts, while also initiating a second auction to relocate data of a second category, e.g., low activity user accounts. Similarly, multiple announcements can be provided by the different data storage nodes so that multiple auctions take place at the same time for different nodes.

The announcement is evaluated by the other nodes in the cluster to determine whether to place a bid, and what conditions, if any, to place on the bid. Furthermore, the other nodes can access their capacity models to determine their ability to accept the data specified in the auction announcement. For example, an under capacity node may determine that it can accept a certain amount of data, while an over capacity or balanced node may determine that it cannot accept any data. In one approach, if a data storage node cannot accept a minimum unit or quantum of data specified by the announcement, it should not place a bid. If no minimum is specified in the announcement, the node is not constrained in this manner. Furthermore, the ability to accept data may be constrained to different categories of data, as discussed above. In the example provided in FIG. 3, each of the data storage nodes 134 and 137 determines that it is able to accept data, and provides a bid to the announcing node, node 131, as indicated by the dashed arrows. The data storage node 131 evaluates the received bids to determine one or more bids to accept. For instance, the data storage node 131 can rank the bids. Consider the above example, in which the data storage node 131 is attempting to relocate five data units of 2 MB each, and three data units of 5 MB each. Node 134 indicates in its bid that it can receive 10 MB of data, while node 137 indicates in its bid that it can receive 5 MB of data. In one example, the bid of node 134 thus ranks higher than that of node 137. Other bid selection decision schemes are also possible, such as accepting the first bid received, or accepting bids randomly. With the bid of the node 134 ranking highest, the announcing node may decide to relocate two of the 5 MB data units to node 134, and one of the 5 MB data units to node 137. Thus, one or more bids can be accepted by the announcing node.

Figure 4:
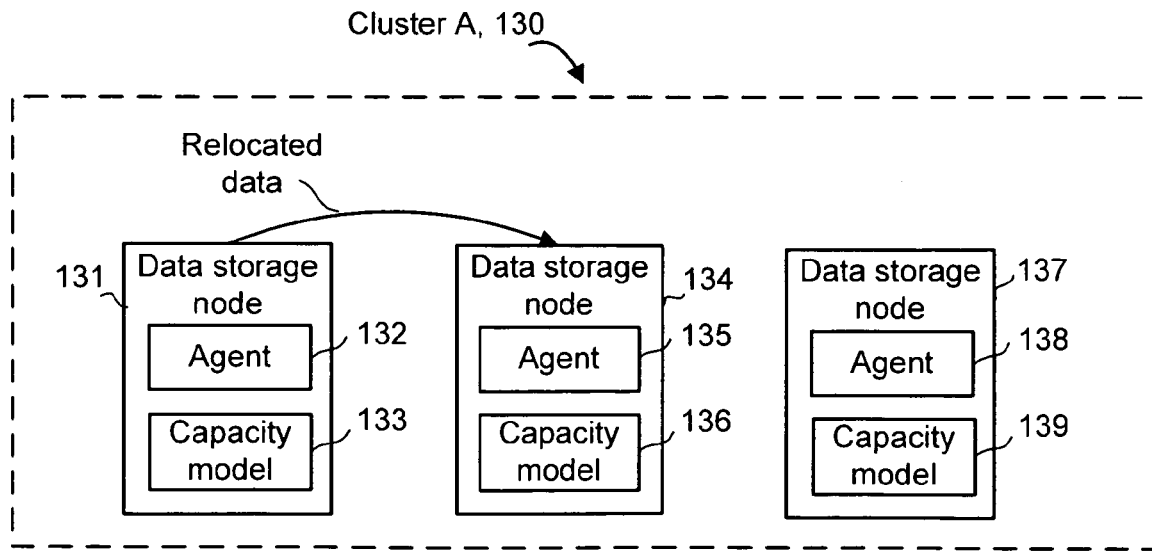
FIG. 4 illustrates relocation of data pursuant to the auction of FIG. 3.

In this case, the five data units of 2 MB each are not relocated in the current auction cycle. However, all or a portion of this data might be relocated in a subsequent auction. In one approach, all of the over-utilization of a data storage node is corrected in a single auction if the one or more bids allow it. In another approach, a more gradual relocation process is used which can avoid unnecessary balancing and re-balancing. To this end, a limit may be imposed on the maximum amount of data that can be relocated in a given auction or other time period. For instance, in the above example, if a per auction limit of 10 MB is imposed, the data storage node 131 may decide to relocate two of the 5 MB data units to node 134, and turn down the bid from node 137 to accept one of the 5 MB data units. In this case, the data storage node 131 communicates its acceptance of the selected bid to node 134 and begins to relocate the data to node 134, as indicated by the solid arrow in FIG. 4, which illustrates relocation of data pursuant to the auction of FIG. 3. Any type of communication scheme may be used to communicate the data. For example, the data storage node 131 may obtain the identity or network address of the data storage node 134 from its bid. If the network address is provided, it can be used directly to communicate the data. If an identifier of the data storage node 134 is provided in its bid, the data storage node 131 can access the topology database 158 to obtain the network address of the data storage node 134, such as a LAN address.

In an alternative approach, the announcement of the data storage node 131 can also be communicated to nodes in other clusters to allow them to place bids and receive relocated data. To this end, the auctioning data storage node can obtain network addresses of the other nodes by querying a component in the appropriate cluster, or the auctioning data storage node can be provided with the network addresses by the administrator/external software function, for instance. Or, the announcement to the nodes in the other cluster can be communicated via the cluster manager.

FIG. 5a illustrates a flowchart showing a method by which a data storage node conducts an auction. At step 500, a single cluster auction process is initiated, such as by expiration of a timer or other trigger. At step 505, the agent of the data storage node obtains the node's utilization level from the capacity model, as discussed previously. The utilization level can be periodically determined so that it is available when the decision to initiate an auction is made. Or, the utilization level can be determined in response to the decision to initiate an auction. At step 510, an announcement regarding the utilization level is provided to the other nodes in the cluster. Subsequently, if one or more bids are received from participating nodes, at decision block 515, the bids are evaluated at step 525, and one or more of the bids are selected at step 530. The bids can be ranked, for instance, and selected based on which has the highest ranking. For equal rankings, one bid can be chosen randomly, in one possible approach. Or, bids can be accepted on a first-come, first served basis, or randomly. Note also that no bid need be accepted. For example, all bids may be rejected when new constraints or demands have been placed on the auctioning node which renders it temporarily unavailable to complete the auction. Data to be relocated is selected at step 535, and an acceptance of the one or more bids is communicated to the one or more selected nodes at step 540. The selected data can be chosen randomly, for instance. The data to be relocated can be selected before the auction or during the auction.

Furthermore, an aging process can be implemented to control when previously relocated data can be relocated again. For example, data which was previously relocated can be tracked, e.g., using a time stamp, so that it is not relocated again for a specified period of time or number of announcement cycles. When the data is user account data, the specific accounts can be tracked to prevent excessive relocations. This approach can avoid inconvenience to the account user since the account data is not available when it is being relocated.

The selected data is relocated to the one or more selected nodes from the auctioning node (step 545), after which the process ends (step 590). It is also possible to communicate a non-acceptance message to the data storage nodes whose bids were not accepted. Alternatively, expiration of a timer at the bidding nodes can serve as notice that their bids were not accepted. The unselected nodes can then end their respective bidding processes.

Optionally, at decision block 515, if no bids are received, or perhaps one or more bids are received but the bids are deemed to be unsatisfactory, the auctioning node can notify the cluster manager (step 520). The notification may include a request to initiate a multi-cluster auction to relocate the data storage node's data to one or more nodes in a different cluster at step 520. A multi-cluster auction involves the cluster that initiated the auction and at least one other cluster. Generally, such a request may be sent if the node-level auction does not achieve a response which is sufficient to reduce the utilization level of the auctioning node by a predetermined amount. For instance, no bids may be received. If the multi-cluster auctioning occurs regularly, a situation in which a single cluster auction to relocate data cannot be fulfilled will typically not be reached unless the cluster is full with data. Or, an auctioning node may decide that it will not relocate an amount of data that is less than a predetermined amount. For example, one or more bids may be received which are for only relatively small amounts of data which are less than the predetermined amount. The predetermined amount may be considered to be a minimum bid which will be accepted, analogous to a reserve price at a conventional auction. The predetermined amount may further vary based on factors such as the number of bidding nodes. For example, a bid for a given amount of data from one node may be acceptable whereas multiple bids from multiple nodes which total to the given amount are not acceptable due to the need to establish multiple connections to relocate the data.

FIG. 5b illustrates a flowchart showing an alternative method by which a data storage node conducts an auction. The method differs from that shown in FIG. 5a in step 500, and by the addition of steps 506 and 507. In this approach, announcements are sent by the data storage nodes based upon a capacity-related triggering event, such as a determination that the node is over capacity or has satisfied some other criterion that indicates it should reduce the amount of data stored. Thus, at step 500, the single cluster auction decision process is initiated. At decision block 506, if the data storage node is over capacity, e.g., the utilization level exceeds an upper threshold, an auction in the cluster can be started (step 507). If the data storage node is not over capacity, there is no need for an auction, and the process ends (step 590). The method otherwise proceeds as discussed in connection with FIG. 5a.

Figure 6:
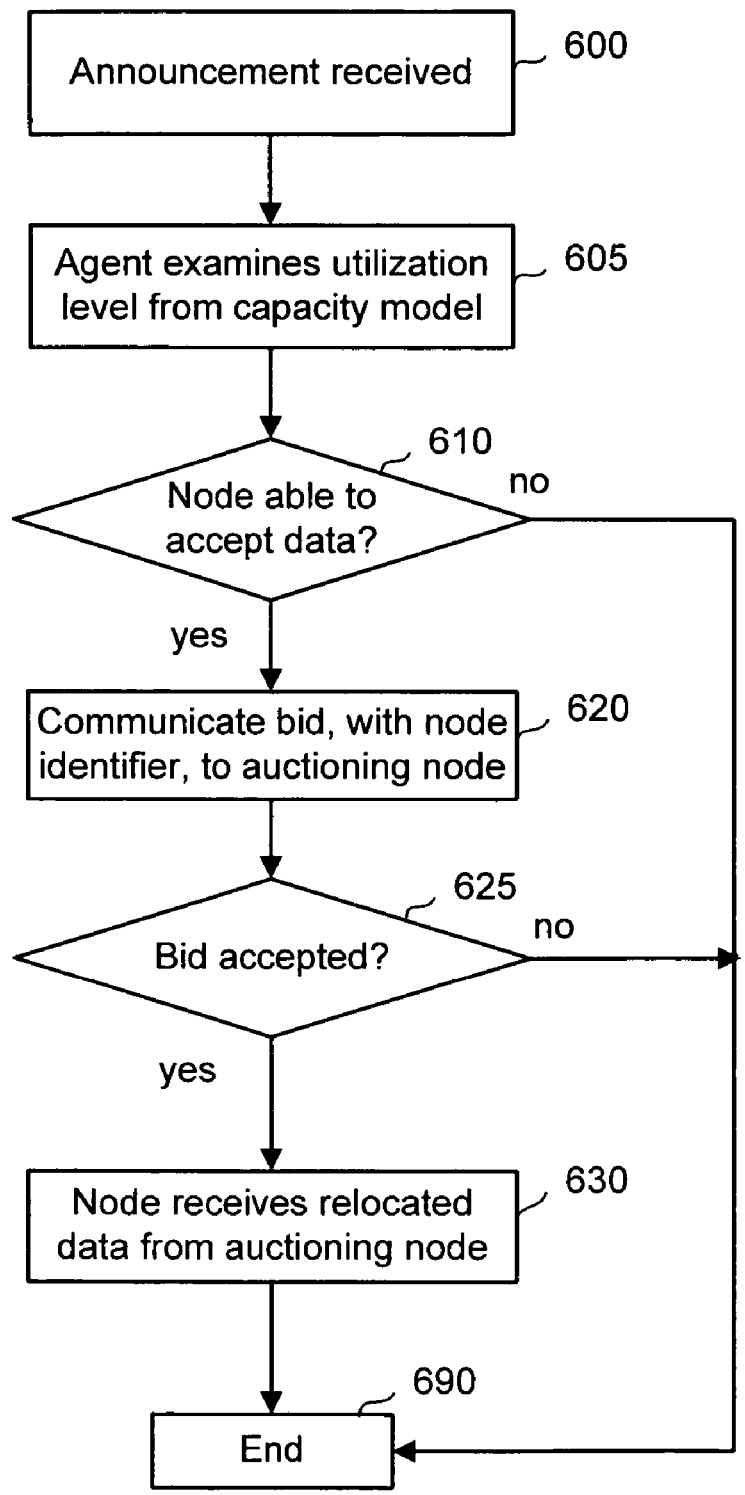
FIG. 6 illustrates a flowchart showing a method by which a data storage node responds to an auction announcement.

FIG. 6 illustrates a flowchart showing a method by which a data storage node responds to an auction announcement. After receiving an auction announcement from another node in the cluster, for instance, (step 600), the agent of the data storage node examines the node's utilization level from its capacity model (step 605) to determine whether the data storage node is able to accept data (decision block 610). For example, the utilization level can be periodically ascertained so that it is already available for examination when an announcement is received. In another approach, the utilization level is determined in response to receipt of the announcement. An under capacity node may determine that it can accept a certain amount of data, in which case the data storage node communicates a bid, with an identifier, such as a network address, to the auctioning node (step 620). The identifier allows the auctioning node to identify the bidding node. If the data storage node cannot accept data, e.g., if it is balanced or over capacity, the process ends at step 690. At decision block 625, if the bid is accepted, the data storage node receives the relocated data from the auctioning node at step 630, and the process ends at step 690. Alternatively, if the bid is not accepted at decision block 625, the process ends at step 690.

Figure 7:
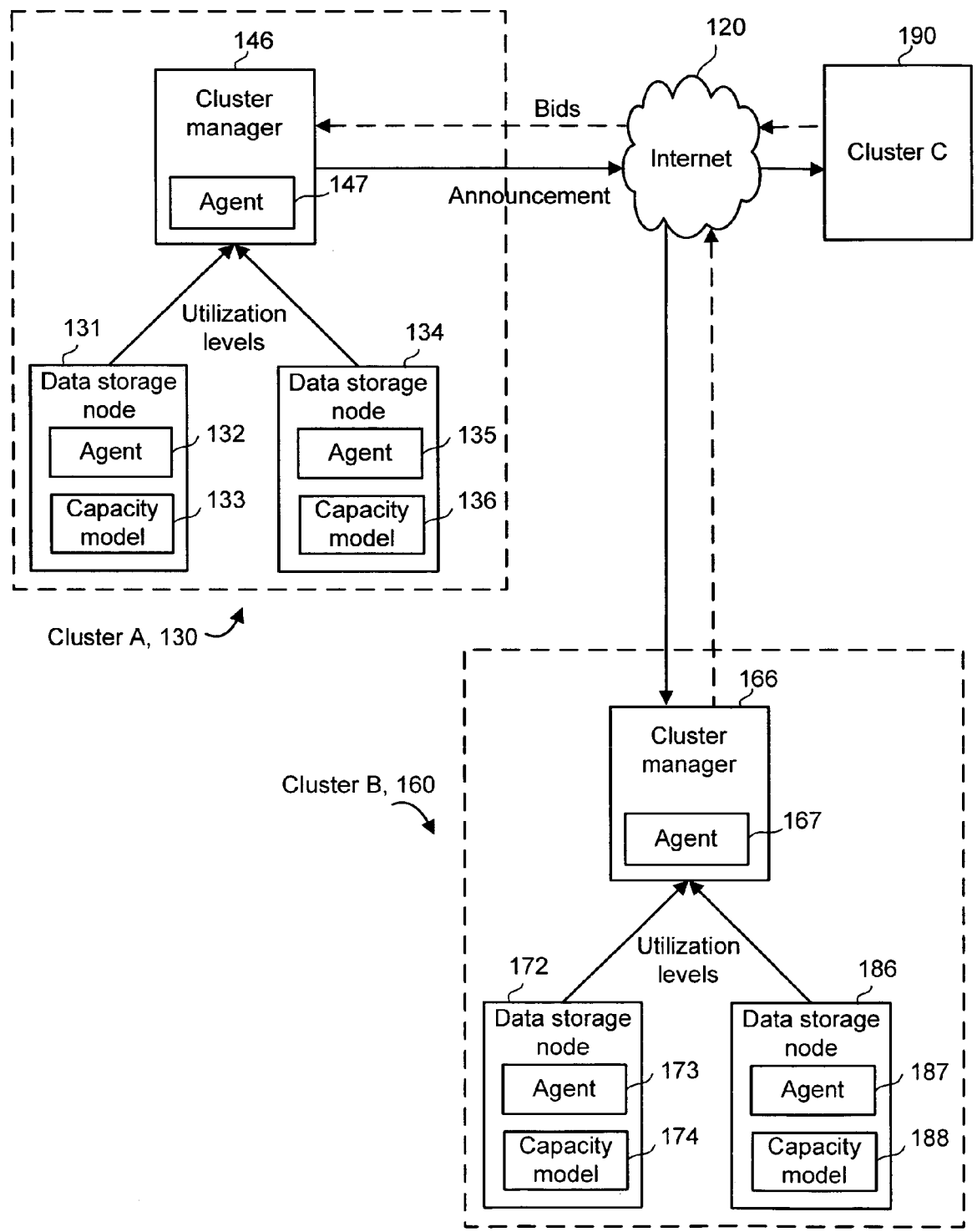
FIG. 7 illustrates a multi-cluster auction in a data center.

FIG. 7 illustrates a multi-cluster auction in a data center. A multi-cluster auction involves the cluster that initiated the auction and at least one other cluster. As discussed previously, a hierarchical data balancing architecture can be provided where an attempt is made to balance the data load at the lowest level, the node level. If this attempt is not successful, which may occur when all of the data storage nodes in a cluster are over capacity or balanced, for instance, an auction can be initiated at the next level of the hierarchy to expand the set of nodes to which data can be relocated. In one approach, this next level is the cluster level, where cluster managers communicate with one another to broker data relocations between nodes. Moreover, once the auctioning process identifies one or more source nodes in one cluster and one or more destination nodes in another cluster, the involved nodes can communicate directly with one another to relocate the data without further guidance by the cluster managers.

In the example provided, details of cluster A 130 and cluster B 160 are provided. Corresponding details of cluster C 190 are not shown but are analogous. The use of three clusters in a multi-cluster auction is an example only. Moreover, the two data storage nodes shown in cluster A 130 and cluster B 160 are also only an example, as any number of data storage nodes, e.g., one or more, can be provided in each cluster. A cluster manager is provided in each cluster. Specifically, cluster A 130 includes a cluster manager 146 with associated data storage nodes 131 and 134. Cluster B 160 includes cluster manager 166 with agent 167, data storage node 172 with agent 173 and capacity model 174, and data storage node 186 with agent 187 and capacity model 188.

Any of the cluster managers can initiate a multi-cluster auction to exchange data with one or more other clusters. In one approach, the cluster managers periodically request that the local data storage nodes provide their utilization levels. Or, the cluster managers can intercept multicast announcements provided by the data storage nodes pursuant to the single cluster auctions, where the announcements include the utilization levels. Each cluster manager aggregates the utilization level data to obtain an aggregated utilization level or metric for the cluster. For example, the metric may indicate whether a cluster as a whole is over capacity, under capacity, or within a balanced, intermediate range. As with the individual node utilization levels, the metric may be based on, e.g., a portion of the memory resources of a cluster which are currently used, a number of data accounts which a cluster is servicing by storing and accessing associated account data, a number of such accounts which represent high activity users, a traffic level which is processed, such as an average data rate in bytes/second, and/or a number or rate of read and write operations.

Analogous to the single cluster auction case, the cluster manager may derive different aggregated utilization levels or metrics, such as for different categories or buckets of data such as user accounts which are serviced by the cluster. For example, separate metrics can be provided for user accounts which consume a high, medium or low amount of resources. In this case, it may be desired to balance the data on the different clusters so that a given cluster is not burdened by a disproportionate number of high activity accounts. The high, medium and low activity accounts can be distributed relatively evenly among the different clusters. The cluster-wide metric can represent an average of the nodes' utilization levels, for instance. The metric can be announced to other cluster managers on a regular basis, or the announcement can be triggered by a determination that the cluster is over capacity with respect to one or more categories of data, and should therefore attempt to relocate data to another cluster. The metric also allows a cluster manager to determine when the cluster is under capacity with respect to one or more categories of data, and therefore is available to receive relocated data from another cluster in an auction initiated by that other cluster.

Various approaches can be used to determine when the cluster managers determine whether, and/or when, to initiate a multi-cluster auction and gather the nodes' utilization level data. For example, the cluster managers may maintain respective timers that determine when to proceed. It is also possible for the administrator/external software function 195, discussed previously, to command each cluster manager to proceed at appropriate times. Or, a cluster manager may proceed based on a request from a node that cannot relocate its data in a single cluster auction.

If a cluster manager determines that the cluster is over capacity, or at another designated time, it can initiate a multi-cluster auction by an announcement to the other clusters in the data center. For example, the agent 147 of the cluster manager 146 may announce an auction to the cluster managers of clusters 160 and 190 using messages communicated via the network cloud 120, as indicated by the solid arrows. The auction announcement can be broadcast or multicast using a publish-subscribe system to any process which has registered interest in receiving it. For example, the agent 147 can publish its auction announcement to automatically notify the agents of the other cluster managers, such as agent 167 of cluster manager 166, which have registered as subscribers. The notification may use TCP or UDP, for instance, as discussed previously.

The auction announcement can provide information such as the identity of the announcing cluster manager and information for contacting it, such as a network address, as well as an amount and/or category of data which it is attempting to relocate. For instance, the announcement may indicate that the cluster manager is attempting to relocate twenty accounts of high-activity users, or simply twenty accounts, without specifying a category. The data need not be expressed in terms of user accounts. For instance, the announcement may indicate a size of the data to be relocated, e.g., 25 MB, and any restrictions as to whether the data must be taken as a unit, or whether it can be divided. For data that can be divided, the announcement may indicate that the cluster manager is attempting to relocate five data units of 2 MB each, and three data units of 5 MB each, for instance. As before, any type of coding scheme can be used to convey information in the announcement regarding the type of data to be relocated, the amount, and any restrictions on which data must be kept together. Although it is generally desirable to minimize the amount of data communicated, other requirements may be specified as well, such as a compression or coding scheme used by the data, how the data is to be maintained, e.g., whether one or more replica or mirror copies must be maintained, and so forth. Moreover, one or more auction announcements can be provided in parallel. For example, a cluster manager may initiate a first auction to relocate data of a first category while also initiating a second auction to relocate data of a second category. Also, as with the single cluster auctions, multiple auctions at the cluster level that are run by one or more different cluster managers can occur at the same time.

The auction announcement thereby can be evaluated by the other cluster managers to determine whether to place a bid, and what conditions, if any, to place on the bid. Furthermore, the cluster managers that receive the auction announcement can access the utilization levels of the associated nodes and derive a corresponding cluster-wide utilization metric to determine their ability to accept the data specified in the auction announcement. For example, the cluster manager of an under capacity cluster may determine that it can accept a certain amount of data, while the cluster manager of an over capacity or balanced cluster may determine that it cannot accept any data. In one approach, if a cluster cannot accept a minimum unit or quantum of data specified by the announcement, it should not place a bid. Furthermore, the ability to accept data may be constrained to different categories of data. In the example provided, the cluster managers of clusters 160 and 190 determine that that they are able to accept data, and provide bids to the announcing cluster manager 146, as indicated by the dashed arrows. The cluster manager 146 evaluates the received bids to determine one or more bids to accept. For instance, the cluster manager 146 can rank the bids. Consider the above example, in which the cluster manager 146 is attempting to relocate five data units of 2 MB each, and three data units of 5 MB each. Cluster manager 166 indicates in its bid that it can receive 10 MB of data, while the cluster manager of cluster 190 indicates in its bid that it can receive 5 MB of data. The bid of cluster 160 thus ranks higher than that of cluster 190. In this case, the announcing cluster manager may decide to relocate two of the 5 MB data units to cluster 160, and one of the 5 MB data units to cluster 190. Thus, one or more bids can be accepted by the announcing cluster manager. As with the individual data storage node in a single cluster auction, the logic used by a cluster manager in determining whether to place a bid, how to rank a bid, and how to determine if a bid is acceptable, can be configurable.

Figure 8:
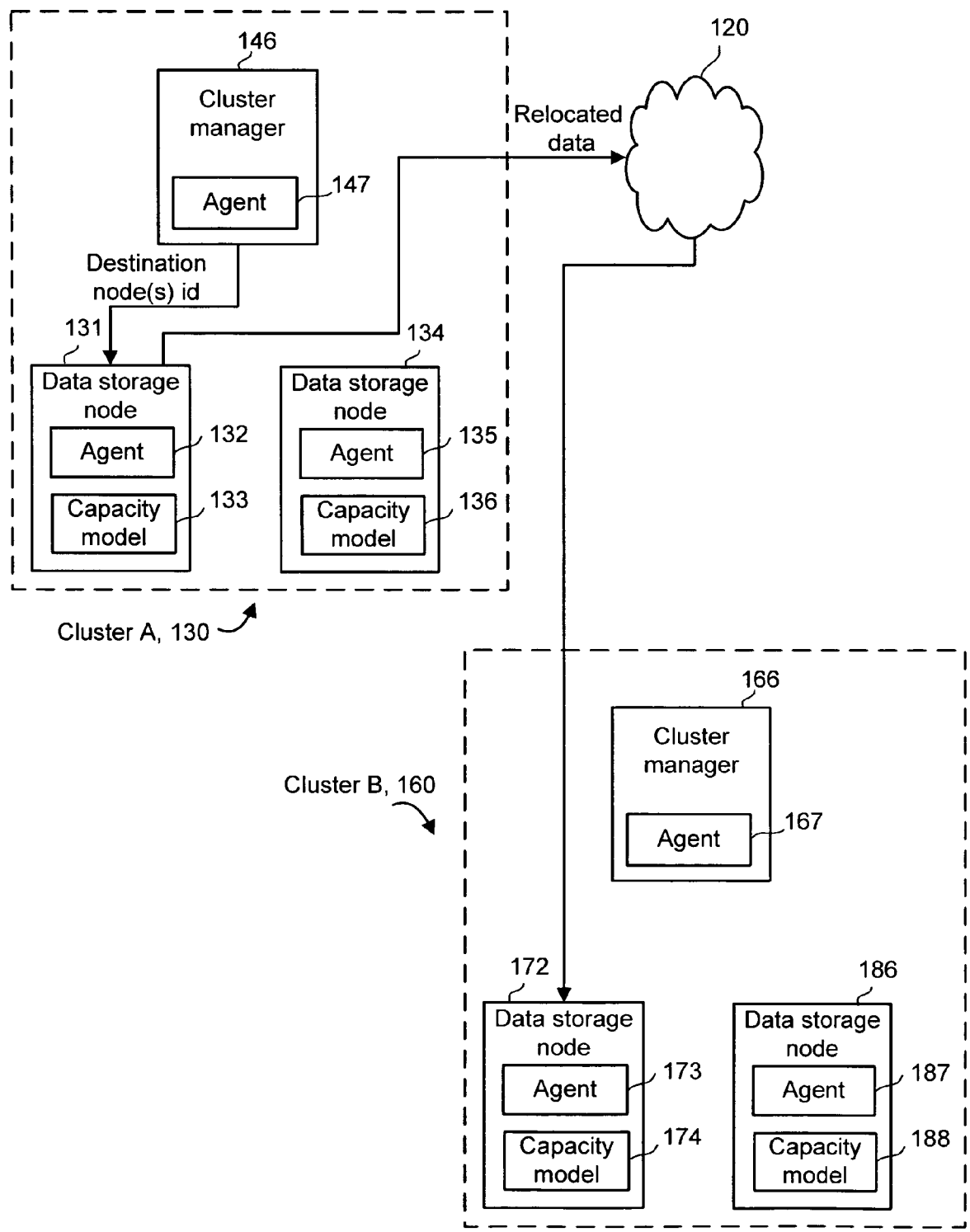
FIG. 8 illustrates relocation of data pursuant to the multi-cluster auction of FIG. 7.

In this case, the five data units of 2 MB each are not relocated in the current auction. However, all or a portion of this data might be relocated in a subsequent auction. As with the node-level balancing, it is not necessary for the over-utilization of a cluster to be corrected in a single auction. A more gradual relocation process can avoid unnecessary balancing and re-balancing. To this end, a limit may be imposed on the maximum amount of data that can be relocated in a given auction or other time period. For instance, in the above example, if a per auction limit of 10 MB is imposed, the cluster manager 146 may decide to relocate two of the 5 MB data units to cluster 160, and turn down the bid from cluster 190 to accept one of the 5 MB data units. In this case, the cluster manager 146 communicates its acceptance of the winning bid to cluster manager 166, and the specified source node 131 begins to relocate the data to a specified destination node 172, as indicated by the solid arrows in FIG. 8, which illustrates relocation of data pursuant to the multi-cluster auction of FIG. 7.

In a multi-cluster auction, the cluster managers have the additional responsibility of identifying one or more data storage nodes to participate in the auction. Specifically, the cluster manager 146 determines which of its nodes will be a source node, e.g., by selecting one or more nodes which are most over capacity. This determination can be made before initiating an auction, or during an auction. Likewise, the cluster manager 166 determines which of its nodes will be a destination node, e.g., by selecting one or more nodes which are most under capacity. This determination can be made before placing a bid, or at the time a bid is placed. In particular, the data storage nodes can be ranked so that the most over capacity nodes are selected as source nodes and the most under capacity nodes are selected as destination nodes. Various other constraints can be accounted for as well in selecting the source and destination nodes, such as the type of data which is being relocated and requirements as to a minimum quantum of data which is to be relocated.

The one or more destination nodes can be identified to the auctioning cluster manager in different ways. In one approach, the bidding cluster manager impersonates the destination node or nodes as part of the bid so that, once the bid is accepted, the destination node is already known by the source node. For example, the bidding cluster manager can provide an identifier such as a network address of a destination node in a sender identifier field in its bid message so that the message appears to have originated from the destination node. In another possible approach, the auctioning cluster manager communicates to the selected cluster manager an acceptance of its bid. In response, the selected cluster manager communicates information to the auctioning cluster manager that can be used to identify the one or more destination nodes, such as the identity or network address. A network address can be used directly to communicate with the destination data storage node 172. If an identifier is provided, the cluster manager 146 can access the topology database 158, for instance, or query a component in the cluster 160, to obtain the network address of the data storage node 172. The cluster manager 146 then provides the address in a relocation command to the data storage node 131, allowing it to communicate directly with the data storage node 172 to relocate data. In another approach, the cluster manager 146 provides the network address of the source data storage node 131 with the acceptance of the bid to the cluster manager 166, which forwards the network address to the data storage node 172 and instructs it to communicate with the data storage node 131. The data storage node 172 then provides its address to the data storage node 131 directly and begins receiving data.

An alternative approach is to have the under capacity clusters which can accept data initiate a multi-cluster auction. In this case, a cluster manager which needs to relocate data can accept one or more of the offers to accept data. This approach should account for the fact that auctions may be initiated even when there are no over capacity clusters that need to relocate data.

FIG. 9*a* illustrates a flowchart showing a method by which a cluster manager conducts a multi-cluster auction. At step 900, the multi-cluster auction process is initiated, such as by expiration of a timer, or by a data storage node requesting a multi-cluster auction. For example, the auction can be started because of an over capacity storage node(s). At step 905, the cluster manager aggregates the utilization levels of the data storage node to obtain a cluster-wide utilization metric. This can occur before or during the announcement process. For example, the cluster manager can receive the utilization levels from the announcements that are sent from time to time by the data storage nodes during the single cluster auctions, and perform the aggregation so that the aggregated utilization level is available when a multi-cluster auction is subsequently initiated. Or, the cluster manager can query the data storage nodes to obtain their utilization levels, such as at the start of the multi-cluster auction.

At step 910, an announcement regarding the aggregated utilization level is provided to the other cluster managers in the data center. One or more bids are received from participating cluster managers at step 915. The bids may identify one or more destination nodes which can receive data. One or more of the bids are selected at step 920. Bids can be accepted based on ranking, on a first-come, first served basis, or randomly, for instance. Note also that no bid need be accepted. For example, all bids may be rejected when new constraints or demands have been placed on the auctioning cluster manager or one or more of the associated nodes which renders them temporarily unavailable to complete the auction. One or more source nodes for transmitting data can be selected prior to, or at the time of, the announcement. An acceptance of the one or more bids can be communicated to the one or more selected cluster managers at step 925. Subsequently, the auctioning cluster manager sends a command to the one or more selected source nodes to relocate a specified amount and/or type of data to the one or more destination nodes (step 930). The data is relocated at step 935 and the process ends at step 990. It is also possible to communicate a non-acceptance message to the cluster managers whose bids were not accepted. Alternatively, expiration of a timer at the bidding cluster managers can serve as notice that their bids were not accepted. The unselected cluster managers can then end their bidding processes. An acknowledgement of each received bid can also be provided by the auctioning cluster manager.

FIG. 9*b* illustrates a flowchart showing an alternative method by which a cluster manager conducts a multi-cluster auction. The method differs from that shown in FIG. 9*a* in step 900, and by the addition of steps 906 and 907. In this approach, an announcement is sent by a cluster manager based upon a capacity-related triggering event, such as a determination that the cluster is over capacity or has satisfied some other criterion that indicates it should reduce the amount of data stored. Thus, at step 900, the multi-cluster auction decision process is initiated. At decision block 906, if the cluster is over capacity, e.g., the aggregated utilization level exceeds an upper threshold, an auction with other clusters can be started (step 907). If the cluster is not over capacity, there is no need for an auction, and the process ends (step 990). The cluster may be considered to be over capacity when the aggregated utilization level exceeds an upper threshold, for instance, and under capacity when the aggregated utilization level is below a lower threshold. The capacity of a data storage node or cluster is not necessarily the maximum possible amount of data that can be stored but, more generally, represents a desired maximum amount of data or other target level. The method then proceeds as discussed in connection with FIG. 9*a*.

Figure 10:
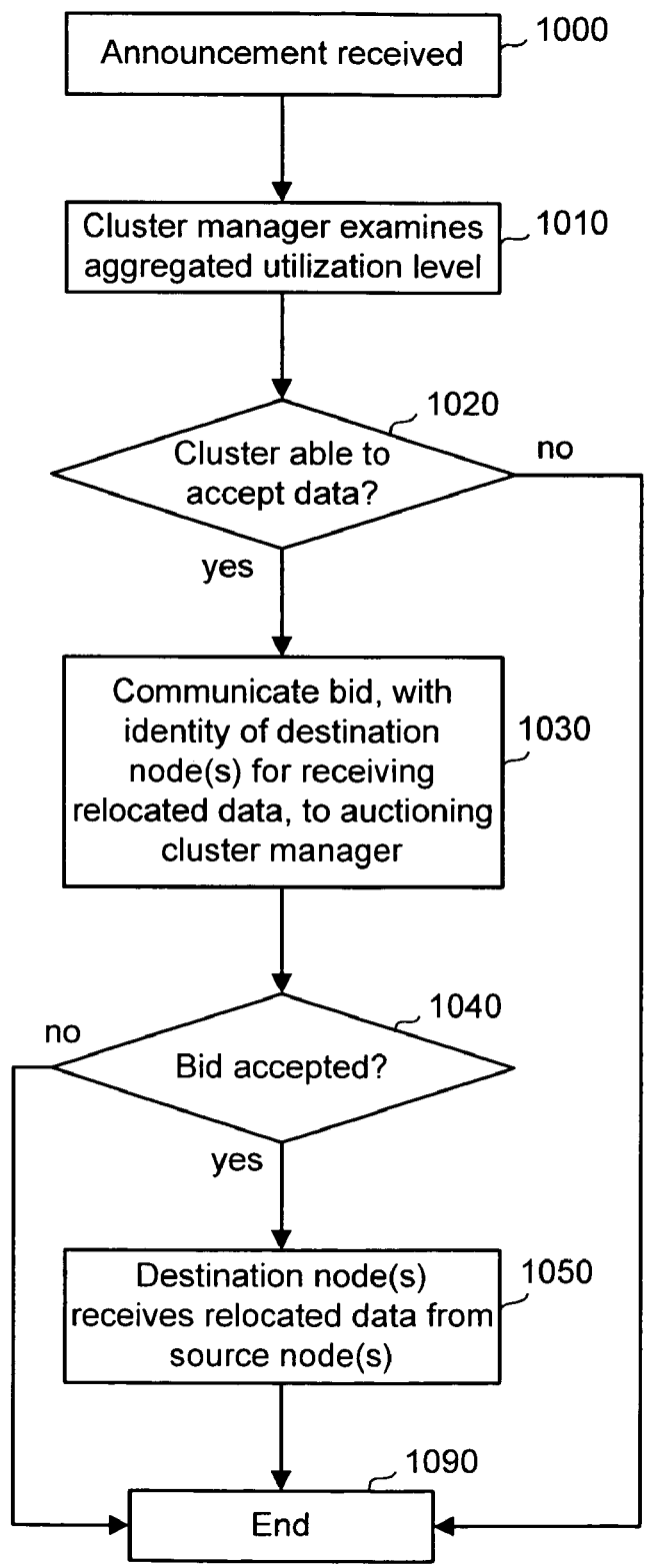
FIG. 10 illustrates a flowchart showing a method by which a cluster manager responds to a multi-cluster auction announcement.

FIG. 10 illustrates a flowchart showing a method by which a cluster manager responds to a multi-cluster auction announcement. After receiving a multi-cluster auction announcement (step 1000), the agent of the cluster manager examines the aggregated utilization level, which can be considered to be a cluster-wide utilization metric (step 1010) to determine whether the cluster is able to accept data (decision block 1020). The cluster manager can periodically determine the aggregated utilization level so that it is available when an announcement is received, or the cluster manager can query its data storage nodes to obtain their utilization levels, and then perform the aggregation, responsive to receipt of an announcement. For example, an under capacity cluster may determine that it can accept a certain amount of data, in which case the cluster manager communicates a corresponding bid, with an identifier, such as a network address, of the bidding cluster manager and/or one or more selected destination nodes for receiving data, to the auctioning cluster manager (step 1030). The cluster manager can select one or more destination nodes to receive a specified amount and/or type of relocated data, either before or during the auction. In one possible approach, the auctioning cluster manager informs the one or more source nodes directly of the identity of the one or more destination nodes so that the data can be relocated directly to the destination nodes.

If the cluster manager cannot accept data, e.g., if it is balanced or over capacity, the process ends at step 1090. At decision block 1040, if the bid is accepted, the one or more destination nodes receive the relocated data from the one or more source nodes (step 1050), after which the process ends at step 1090. Alternatively, if the bid is not accepted at decision block 1040, the process ends at step 1090.

Figure 11:
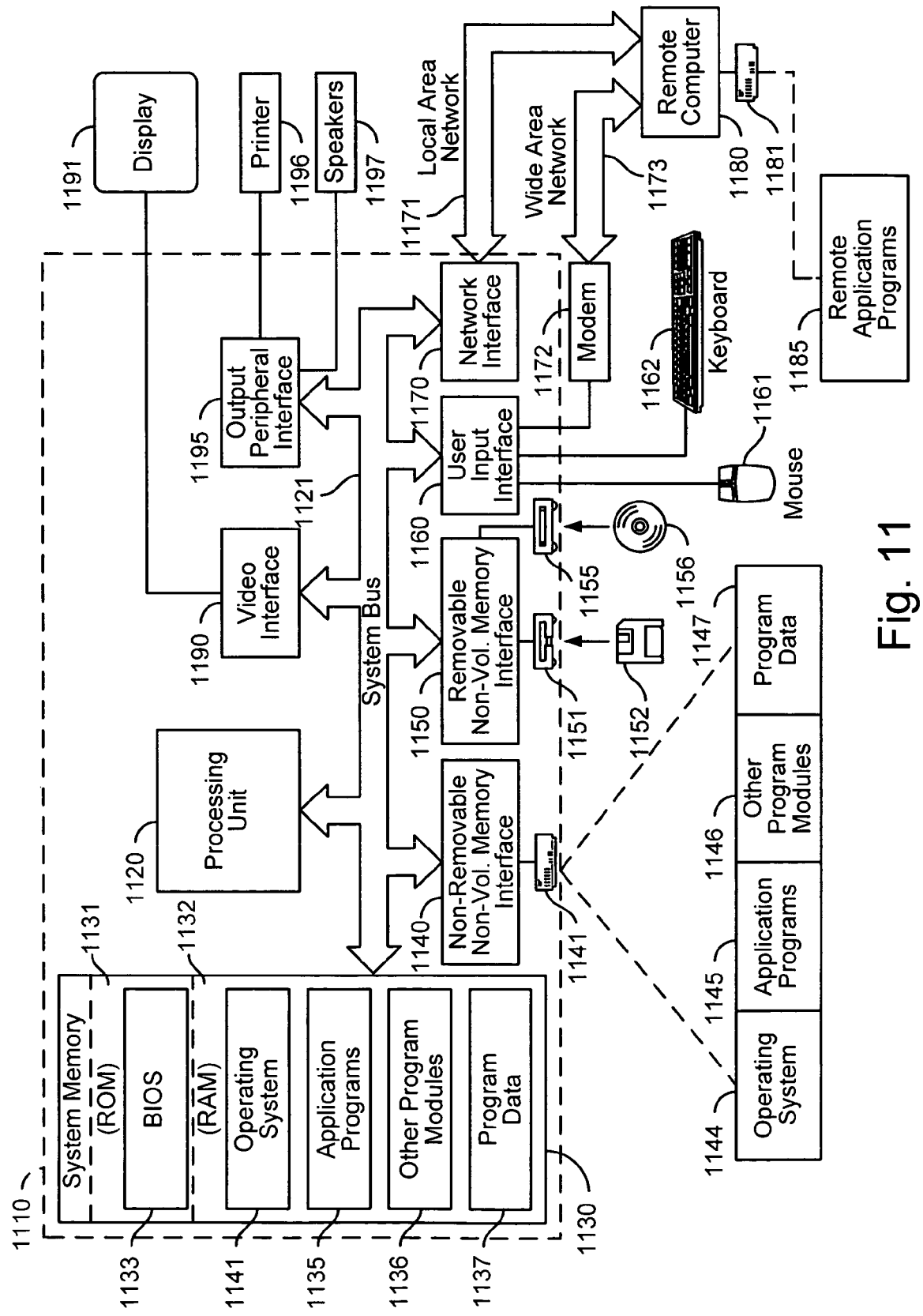
FIG. 11 is a block diagram of computer hardware suitable for implementing embodiments of the invention.

FIG. 11 is a block diagram of computer hardware suitable for implementing embodiments of the invention. An exemplary system for implementing the invention includes a general purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules or other data.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. For example, hard disk drive 1141 is illustrated as storing operating system 1144, application programs 1145, other program modules 1146, and program data 1147. These components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated. The logical connections depicted include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

Figure 12:
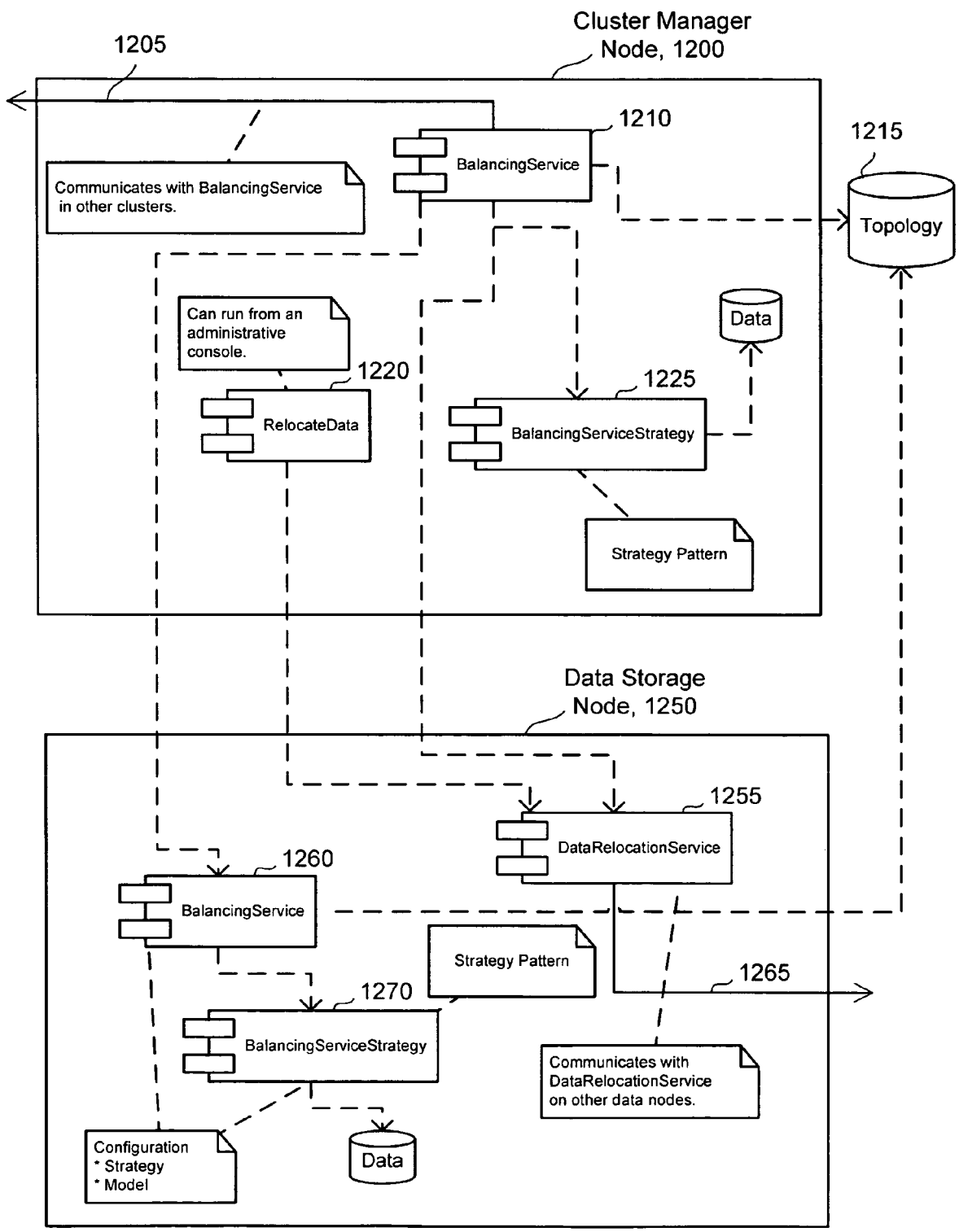
FIG. 12 is a deployment diagram which illustrates major components of a data balancing architecture.

FIG. 12 is a deployment diagram which illustrates major modules or components of a data balancing architecture. In one approach, the data balancing architecture includes two services, each of which implements balancing within its own hierarchical level. In particular, a balancing service module 1210 runs on the cluster manager 1200 and is responsible for aggregating traffic information from the individual data storage nodes and facilitating moves across clusters. A second balancing service module 1260 runs on each data storage node, such as node 1250, and works to negotiate and facilitate data relocations between data storage nodes within a cluster. Both balancing services can employ a strategy pattern to allow different policies to be configured for balancing at the data storage node set level and the cluster level. The strategy pattern is implemented in balancing service strategy modules 1225 and 1270, which can access local data.

The balancing service strategy modules 1225 and 1270 and balancing service modules 1210 and 1260 can be configured based on the strategy and a capacity model. The balancing service modules 1210 and 1260 may access a topology database 1215 to obtain network addresses of other cluster managers and data storage nodes. Furthermore, the balancing service module 1210 may communicate with balancing service modules in other clusters via a path 1205. In the data storage node 1250, a data relocation service module 1255 communicates with the data relocation service module on other data storage nodes via a path 1265 to arrange the relocation of data between the data storage nodes. The data relocation service module 1255 may be controlled by the balancing service module 1210 as well as by a data relocation service module 1220 on the cluster manager 1200, which can be run from an administrative console, for instance, or by another software process.

In particular, the data balancing service modules 1210 and/or 1260, and the data relocation service module 1255, can be thought of as respective core engines. The data balancing service module 1210 facilitates balancing of the system based on directives it receives from pluggable strategy modules, which provide algorithms that implement rules that indicate to the framework when, how, and what data or accounts to relocate. This data balancing engine, which works the same at both the data storage node level and the cluster manager level, then acts as an agent to perform the requested relocations using the data relocation service module 1255. The data balancing engine receives and facilitates communication between pluggable strategies running within the service on different machines, and performs the job of communicating information from the strategies to their counterparts and then running an auction based bidding system in which the strategies can bid to ultimately accept data resources controlled by other strategies. When a bid is accepted, the accepting strategy can then use the data relocation engine to facilitate the specific user relocation(s) it associates with the bid.

The approach described benefits from scalability and can accommodate failures. For example, if the balancing service module 1210 that runs on the cluster manager 1200 goes down, the data storage nodes within the cluster can still cooperate to balance themselves. Also, the other clusters can still cooperate to balance among themselves. Likewise, if the balancing service module 1260 on the data storage node 1250 goes down, the other data storage nodes in the cluster can still cooperate to balance themselves and the cluster can still participate in balancing tasks with other clusters.

Overall, information is exchanged between the data storage nodes in an optimal fashion. This information can represent the weight or cost of data units on each source data storage node relative to a capacity model. The strategies on destination data storage nodes can use this information to bid on data units from the source data storage nodes based on available resources the destination may have when compared to its capacity model. In one approach, the balancing operation is driven by the receivers of data units. The receiver data storage nodes are less utilized than the senders and they know they can help in alleviating the imbalance. It is up to the senders to accept the invitations for off-loading some of their data at any given time.

Ultimately, the source data storage nodes and clusters can decide which bids to accept or reject and which specific data units to relocate as a result of an accepted bid. The destination data storage node or cluster is doing the bidding and has control over whether to bid at all and, if placing a bid, can specify the weight of data units to receive. The specifics are controlled by the strategy implementation and encoded in the protocol deciphered between the strategies. The framework remains neutral to the specifics of the protocol and does not directly participate in the negotiations themselves.

Once a bid is accepted, the source data storage node strategy notifies the framework which handles the job of submitting data relocation requests to the data relocation service module 1255. In this way, an acceptable new data unit location is identified by the destination data storage node. The data units to move are selected by the source data storage node with overall guidance, with respect to an acceptable weight, from the destination data storage node. The source data storage node can utilize metrics to then determine whether it is worth the cost to move data, in the form of data units, to the destination and if so, which specific data units to move. Finally, the source data storage node pushes the units to the destination using the data relocation service module 1255. Overall, the design optimally suggests a pull request, based on resource availability, and a push data model.

At the cluster level, during initialization, the cluster manager listens to the messages that are being published from its data storage nodes. It keeps track of, and aggregates, the information received from each node, and identifies which nodes are candidates for participating in multi-cluster relocations, either as a source or a destination. Using the method Strategy.GenerateState (see also FIG. 13), the cluster strategy generates the aggregate cluster-wide utilization metric. This is an alternative implementation to the cluster manager intercepting broadcast traffic and generating the state on its own. Using the method Strategy.BroadcastStatus, the cluster strategy broadcasts the metric. The cluster manager's 'host' attribute is set to the host of the cluster strategy. If the strategy determines that a bid should be made, it determines how to split the bid across data storage nodes within its ranks. Using the method Strategy.GenerateBid, it then issues bids for specific data storage nodes by setting a 'host' attribute, for each bid, to the respective data storage node. The class elements contained within the bid element hold the values being requested, in proxy, by that data storage node. When invoked, the cluster strategy maps the bid element to a given host within its ranks. Once the mapping is done, it then invokes the BalancingServiceAgent.MakeBid method on the selected host within its rank, using the method Strategy.MakeBid. It passes in the node parameter received as part of the bid element's 'host' attribute. In this way, the cluster strategy acts as a proxy for the data storage node doing the bidding.

Figure 13:
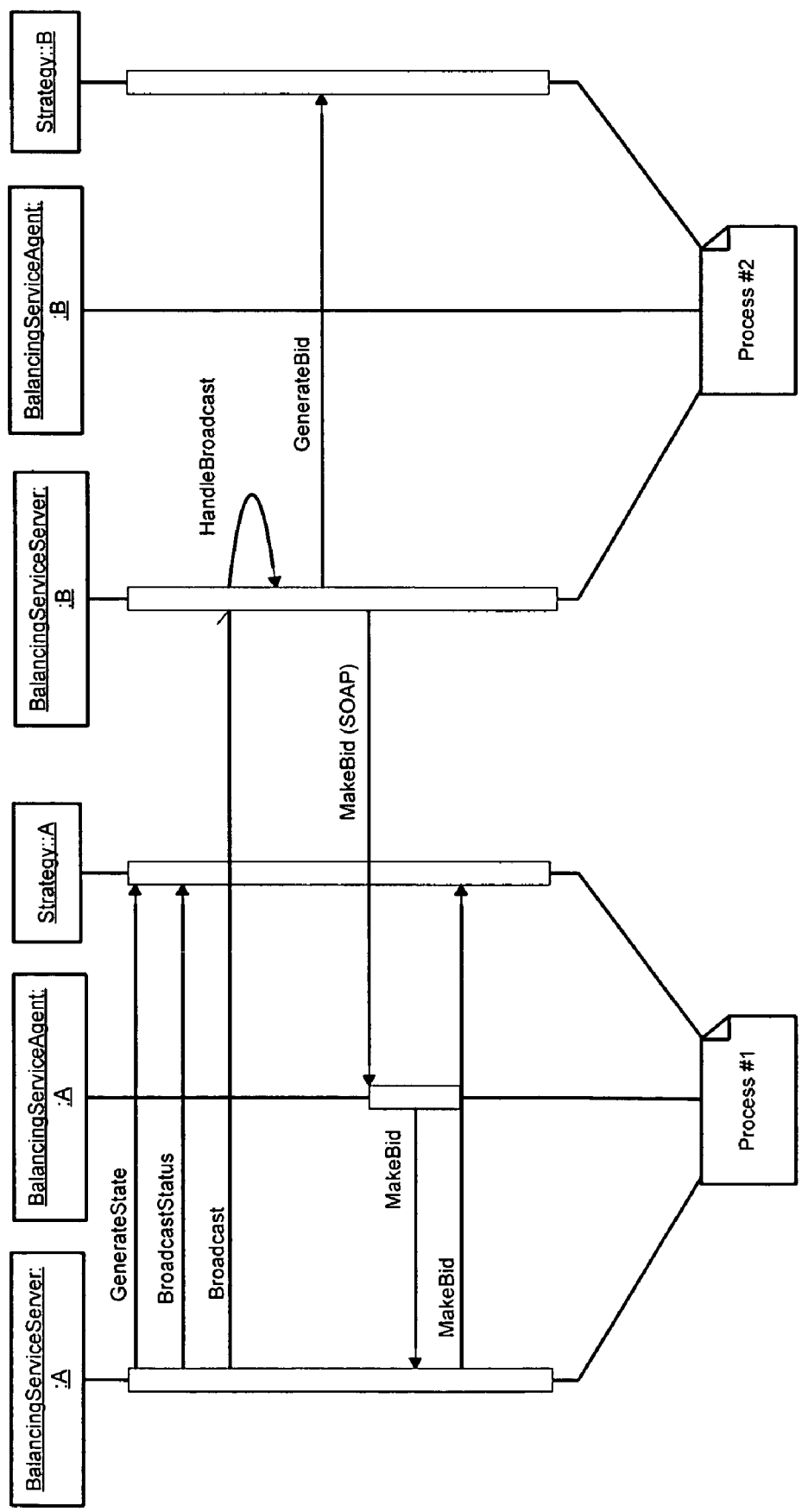
FIG. 13 is an activity diagram which shows how a data storage node level bidding process is managed by a core engine.

FIG. 13 is an activity diagram which shows how a data storage node level bidding process is managed by a core engine. Service A is broadcasting status and receiving bids, while Service B decides to generate a bid. In a particular implementation, the BalancingServiceAgent can be implemented as a .NET remoting (Simple Object Access Protocol—SOAP) object that performs the work of passing bid requests onto the core engine for processing. In Service A, the BalancingServiceServer:A class invokes the GenerateState method which is handled by a Strategy:A class. The BalancingServiceAgent:A class invokes the BroadcastStatus method on the Strategy:A interface in order to ascertain whether the Strategy wants to broadcast a message. In response, the Strategy is responsible for packaging and returning a message which is then broadcast to all other nodes. The BalancingServiceServer:B class receives the broadcast and then invokes the HandleBroadcast method, which in turn invokes the GenerateBid method of the strategy. The strategy then has a chance to determine whether to generate a bid or not. It indicates that decision in the return value of the GenerateBid method. If a bid is to be made, the BalancingServiceServer:B class invokes the MakeBid method using SOAP, for instance, which is handled by the BalancingServiceAgent:A class which, in turn, invokes the MakeBid method which is handled by the BalancingServiceServer:A class. The BalancingServiceServer:A class then invokes the MakeBid method that is handled by the Strategy:A class. An analogous approach applies to the cluster level, with the additional tasks of aggregation and picking appropriate source or destination nodes.

Figure 14:
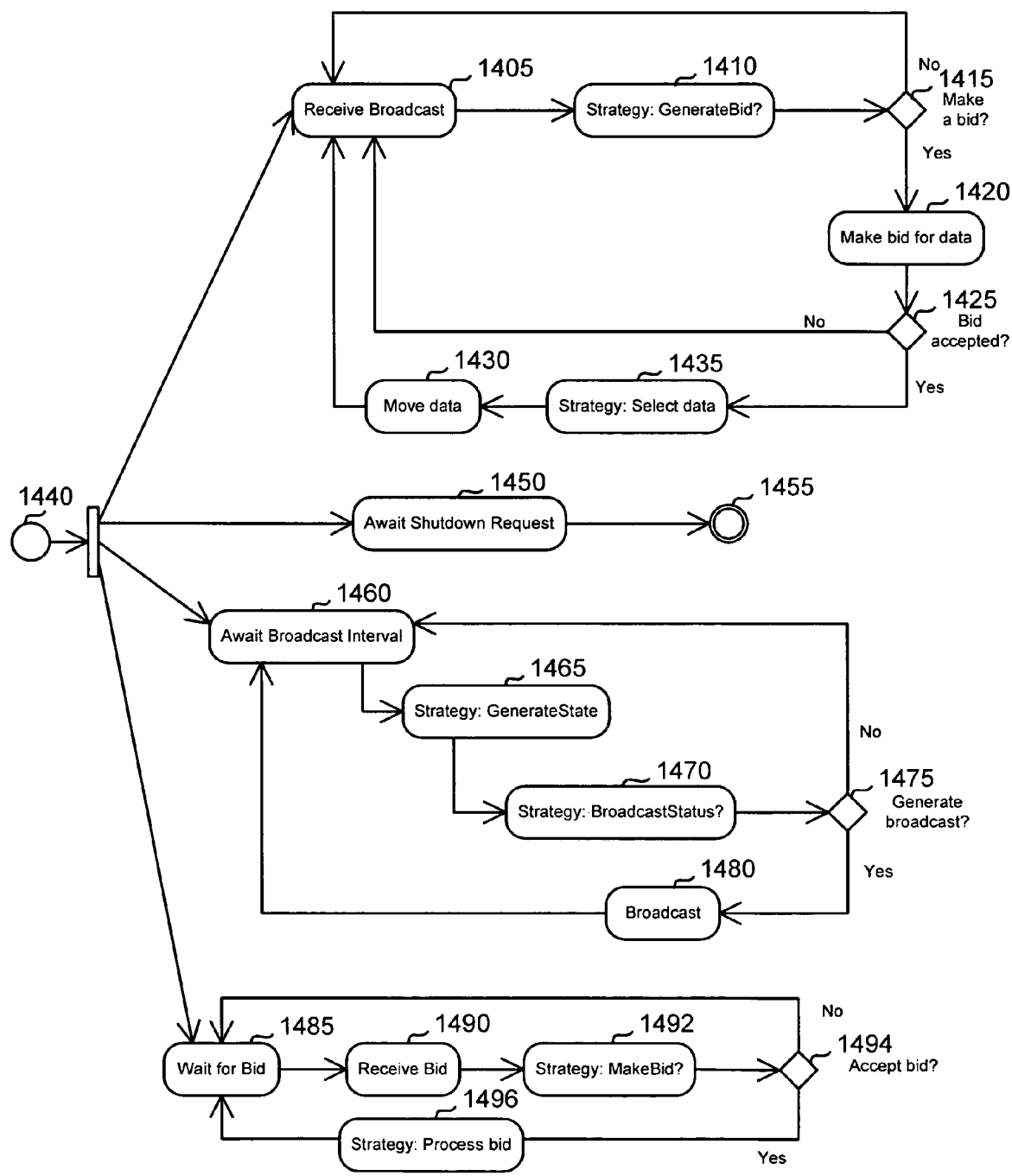
FIG. 14 is a state chart of a core engine of a balancing service.

FIG. 14 is a state chart of a core engine of a balancing service. After a start state 1440, up to four paths can be taken simultaneously, in a multi-threaded approach. In a first path, a data storage node or cluster manager awaits a broadcast auction announcement in a Receive Broadcast state 1405. When a broadcast is received, the Strategy determines whether to invoke the GenerateBid method in state 1410. If a bid is made, at decision point 1415, a state 1420 is entered in which a bid for data is made. If the bid is accepted at decision point 1425, the Strategy selects the data to be relocated, such as the data associated with specific user accounts, at state 1435, and moves the data, at state 1430 by using the data relocation service. If the bid is not accepted, the flow returns to state 1405 to await another broadcast auction announcement.

In a second path, a state 1450 is entered to await a shutdown request, after which a shutdown state 1455 is entered.

In a third path, a data storage node or cluster manager awaits the time to determine whether to announce an auction. In particular, a state 1460 is entered in which a broadcast interval is awaited. When the broadcast interval arrives, a state 1465 is entered in which the Strategy invokes the GenerateState method, and a state 1470 is entered in which the Strategy determines whether to invoke the BroadcastStatus method to announce an auction. If a broadcast is generated, at decision point 1475, a broadcast state 1480 is entered, after which the process returns to state 1460 to await the next broadcast interval. If no broadcast is generated at decision point 1475, the process returns directly to state 1460.

In a fourth path, a data storage node or cluster manager has broadcast an auction announcement and awaits bids at state 1485. After a bid is received at state 1490, the Strategy determines whether to accept or reject the bid at state 1492. At decision point 1494, if the bid is accepted, the engine processes the bid for the strategy at state 1496, and the process returns to state 1485 to wait for a subsequent bid. If the bid is not accepted, the process returns directly to state 1485.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for balancing a data load among a plurality of data storage nodes in at least one network, comprising:
   determining, at a first data storage node of the plurality of data storage nodes, an amount of data subject to an auction to reduce an amount of data stored at the at least one utilization level of a first data storage node, the amount of data subject to the auction is determined based on an amount of data stored at the first data storage node;
   multicasting, in the at least one network, information regarding the amount of data subject to the auction, the information indicating that the data subject to the auction includes data of relatively high activity user accounts and data of relatively low activity user accounts;
   the information is received by other data storage nodes of the plurality of data storage nodes which have registered to receive multicast announcements from the first data storage node; and
   in response to receipt of the information, each of the other data storage nodes checks an amount of data stored thereat to determine whether it has available capacity to accept new data, and communicates a bid to the first data storage node if it has the capacity to accept new data, the bid from at least one of the other data storages nodes indicates that at least one of data of the relatively high activity user accounts and data of the relatively low activity user accounts will be accepted by the at least one of the other data storages nodes, where the first data storage node accepts at least one bid and relocates data to one or more of the other data storage nodes whose bids were accepted.

2. The computer-implemented method of claim 1, wherein:
   the first data storage node determines, at regular intervals, an amount of data subject to periodic auctions based on an amount of data stored at the first data storage node at the regular intervals; and
   the first data storage node multicasts in the at least one network, at the regular intervals, information regarding the amount of data subject to the periodic auctions, the periodic auctions are conducted regardless of a level of the amount of data stored at the first data storage node at the regular intervals.

3. The computer-implemented method of claim 1, wherein:
the bid from the at least one of the other data storages nodes indicates an amount of data that the at least one of the other data storage nodes can accept.

4. The computer-implemented method of claim 1, wherein:
the determining the amount of data subject to the auction comprises determining a first amount of data subject to the auction for a first category of user accounts which are serviced by the first data storage node, and determining a second amount of data subject to the auction for a second category of user accounts which are serviced by the first data storage node;
the multicasting information comprises multicasting information regarding the first and second amounts of data in the at least one network;
the first data storage node accepts at least one bid for the first category of user accounts, and relocates data of the first category of user accounts to one or more of the other data storage nodes whose bid for the first category of user accounts was accepted; and
the first data storage node accepts at least one bid for the second category of user accounts, and relocates data of the second category of user accounts to one or more of the other data storage nodes whose bid for the second category of user accounts was accepted.

5. The computer-implemented method of claim 4, wherein:
user accounts in the first category have a relatively high activity and consume relatively more resources than user accounts in the second category, and the first data storage node relocates the data of the first category so that the first data storage node is not burdened by a disproportionate number of high activity accounts.

6. The computer-implemented method of claim 1, further comprising:
implementing an aging process to control a time period after which data which was relocated to the first data storage node can be relocated from the first data storage node in an auction, including tracking a time at which the relocated data was relocated to the first data storage node, and ensuring that the relocated data is not relocated from the first data in an auction for a specified period of time.

7. A computer-implemented method for balancing a data load among a plurality of clusters in at least one network, each cluster comprising a plurality of data storage nodes, the method comprising:
determining an amount of data stored at a first cluster of the plurality of clusters;
determining an amount of data subject to an auction of the first cluster based on the amount of data stored, the auction is for relocating data from the first cluster to at least one other cluster of the plurality of clusters, to reduce an amount of data stored at the first cluster;
multicasting information regarding the amount of data subject to the auction from the first cluster to the other clusters, the information indicating that the data subject to the auction includes data of relatively high activity user accounts and data of relatively low activity user accounts;
the information is received by other clusters of the plurality of clusters which have registered to receive multicast announcements from the first cluster; and
in response to receipt of the information, each of the other clusters checks an amount of data stored thereat to determine whether it has available capacity to accept new data, and communicates a bid to the first cluster if it has the capacity to accept new data, the bid from at least one of the other clusters indicates that at least one of data of the relatively high activity user accounts and data of the relatively low activity user accounts will be accepted by the at least one of the other clusters, where the first cluster accepts at least one bid and relocates data to one or more of the other clusters whose bids were accepted.

8. The computer-implemented method of claim 7, wherein:
the information is provided to the other clusters even when the first cluster is not over-capacity.

9. The computer-implemented method of claim 7, wherein:
the at least one bid indicates an amount of data that the at least one of the other clusters can accept.

10. The computer-implemented method of claim 7, wherein:
the determining the amount of data subject to the auction comprises determining a first amount of data subject to the auction for a first category of user accounts which are serviced by the first cluster, and determining a second amount of data subject to the auction for a second category of user accounts which are serviced by the first cluster; and
the multicasting information comprises multicasting information regarding the first and second amounts of data to the other clusters;
the first cluster accepts at least one bid for the first category of user accounts, and relocates data of the first category of user accounts to one or more of the other clusters whose bid for the first category of user accounts was accepted; and
the first cluster accepts at least one bid for the second category of user accounts, and relocates data of the second category of user accounts to one or more of the other clusters whose bid for the second category of user accounts was accepted.

11. The computer-implemented method of claim 10, wherein:
user accounts in the first category have a relatively high activity and consume relatively more resources than user accounts in the second category; and
the first cluster relocates the data of the first category so that the first cluster is not burdened by a disproportionate number of high activity accounts.

12. The computer-implemented method of claim 1, wherein:
the first data storage node maintains a timer that determines when the first data storage node determines the amount of data subject to the auction and when the first data storage node multicasts the information regarding the amount of data subject to the auction.

13. The computer-implemented method of claim 1, wherein:
a token is passed among the plurality of data storage nodes, the first data storage node determines the amount of data subject to the auction and multicasts the information regarding the amount of data subject to the auction when the first data storage node receives the token.

14. The computer-implemented method of claim 1, wherein:
the multicast information specifies a minimum unit of data which is to be relocated from the first data storage node; and
in response to receipt of the information, each of the other data storage nodes determines whether it is able to accept the minimum unit of data, and each of the other data storage nodes which determines that it cannot accept the minimum unit of data does not place a bid.

15. The computer-implemented method of claim 1, wherein:

the amount of data which is subject to the auction exceeds a per-auction limit;

the first data storage node rejects at least one bid which, if accepted, would cause the amount of data which is relocated by the first data storage node in the auction to exceed the per-auction limit; and at least a portion of data of the first data storage node for which the at least one bid was rejected is subject to a subsequent auction.

* * * * *